US010553017B2

(12) United States Patent
Yeoh et al.

(10) Patent No.: US 10,553,017 B2
(45) Date of Patent: Feb. 4, 2020

(54) CONTINUOUS TIME WARP AND BINOCULAR TIME WARP FOR VIRTUAL AND AUGMENTED REALITY DISPLAY SYSTEMS AND METHODS

(71) Applicant: Magic Leap, Inc., Plantation, FL (US)

(72) Inventors: Ivan Li Chuen Yeoh, Tampa, FL (US); Lionel Ernest Edwin, Plantation, FL (US); Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/999,160

(22) Filed: Aug. 17, 2018

(65) Prior Publication Data
US 2019/0019328 A1 Jan. 17, 2019

Related U.S. Application Data

(63) Continuation of application No. 15/686,885, filed on Aug. 25, 2017.
(Continued)

(51) Int. Cl.
*G06T 1/60* (2006.01)
*G06T 13/00* (2011.01)
(Continued)

(52) U.S. Cl.
CPC ............ *G06T 15/205* (2013.01); *A63F 13/00* (2013.01); *G02B 27/017* (2013.01);
(Continued)

(58) Field of Classification Search
CPC ......... G06T 1/60; G06T 13/00; G06T 15/005; G06T 15/205; G06T 19/003;
(Continued)

(56) References Cited

U.S. PATENT DOCUMENTS

2008/0297437 A1 12/2008 Takahashi
2012/0105606 A1* 5/2012 Kim .................. G09G 3/342
348/51
(Continued)

OTHER PUBLICATIONS

"Asynchronous Timewarp with the Oculus Rift", Available online at https://www.youtube.com/watch?v=-t-ALnqYV3c#t=33, Sep. 7, 2014, 9 pages.
(Continued)

*Primary Examiner* — Ke Xiao
*Assistant Examiner* — Jed-Justin Imperial
(74) *Attorney, Agent, or Firm* — Kilpatrick Townsend & Stockton LLP

(57) ABSTRACT

Embodiments of the present disclosure relate to continuous and/or binocular time warping methods to account for head movement of the user without having to re-render a displayed image. Continuous time warping allows for transformation of an image from a first perspective to a second perspective of the viewer without having to re-render the image from the second perspective. Binocular time warp refers to the late-frame time warp used in connection with a display device including a left display unit for the left eye and a right display unit for the right eye where the late-frame time warp is performed separately for the left display unit and the right display unit. Warped images are sent to the left and the right display units where photons are generated and emitted toward respective eyes of the viewer, thereby displaying an image on the left and the right display units at the same time.

20 Claims, 26 Drawing Sheets

View projection

Related U.S. Application Data

(60) Provisional application No. 62/380,302, filed on Aug. 26, 2016.

(51) Int. Cl.

| | |
|---|---|
| *G06T 15/00* | (2011.01) |
| *G06T 15/20* | (2011.01) |
| *G06T 19/00* | (2011.01) |
| *G06F 3/01* | (2006.01) |
| *G06F 3/0481* | (2013.01) |
| *A63F 13/00* | (2014.01) |
| *G02B 27/01* | (2006.01) |

(52) U.S. Cl.
CPC ............ *G06F 3/04815* (2013.01); *G06T 1/60* (2013.01); *G06T 13/00* (2013.01); *G06T 15/005* (2013.01); *G06T 19/003* (2013.01); *G06T 19/006* (2013.01); *G06F 3/012* (2013.01); *G06T 2215/16* (2013.01)

(58) Field of Classification Search
CPC ... G06T 19/006; G06T 2215/16; G06F 3/012; G06F 3/04815; G02B 27/017; A63F 13/00

See application file for complete search history.

(56) References Cited

U.S. PATENT DOCUMENTS

| | | | | |
|---|---|---|---|---|
| 2013/0229529 A1* | 9/2013 | Lablans | ............ | H04N 5/23238 348/169 |
| 2015/0002542 A1* | 1/2015 | Chan | ..................... | G06F 3/048 345/633 |
| 2015/0348327 A1* | 12/2015 | Zalewski | .................. | G06F 3/01 345/419 |
| 2016/0163109 A1* | 6/2016 | Kobayashi | ............. | G06F 3/011 345/633 |
| 2018/0061121 A1 | 3/2018 | Yeoh et al. | | |

OTHER PUBLICATIONS

"Oculus Rift—How Does Time Warping Work?", Available online at https://www.youtube.com/watch?v=WvEXM1QQtl, Apr. 19, 2014, 41 pages.

Abrash, "Why Virtual Isn't Real to Your Brain", Ramblings in Valve Time, Available Online At: http://blogs.valvesoftware.com/abrash/why-virtual-isnt-real-to-your-brain/, May 15, 2013, 21 pages.

Buck, "Taking the Plunge into GPU Computing", GPU Gems 2, Chapter 32, Available Online At: http://http.developer.nvidia.com/GPUGems2/gpugems2_chapter32.html, 2004, 8 pages.

Chen, et al., "View Interpolation for Image Synthesis", Apple Computer, Inc., Available Online At: http://cseweb.ucsd.edu/~ravir/6998/papers/p279-chen.pdf, 1993, pp. 279-288.

Chuang, et al., "Image warping/morphing", Digital Visual Effects, Spring 2005, available online at http://www.csie.ntu.edu.tw/~cyy/courses/vfx/05spring/lectures/handouts/lec03_morphing_4up.pdf, Mar. 9, 2005, 20 pages.

Del Rizzo, "Flow Maxwell's VR Direct Brings Virtual Reality Gaming Closer to Reality", The Official NVIDIA Blog, Available Online At: http://game24.nvidia.com/maxwell/, Sep. 18, 2014, 3 pages.

Lavalle, "The Latent Power of Prediction", Oculus Developer Blog, Available Online At: https://www.oculus.com/blog/the-latent-power-of-prediction/, Jul. 12, 2013, 7 pages.

Mark, et al., "Post-Rendering 3D Warping", In Proceedings of 1997 Symposium on Interactive 3D Graphics, Available Online At: http://citeseerx.ist.psu.edu/viewdoc/download?doi=10.1.1.13.1789&rep=rep1&type=pdf, Apr. 27-30, 1997, pp. 7-16.

PCT/US2017/048656, "International Preliminary Report on Patentability", dated Mar. 7, 2019, 9 pages.

"Oculus Rift—How Does Time Warping Work?", eVRydayVR, Available Online At: https://www.youtube.com/watch?v=WvtEXMIQQtl, Apr. 19, 2014, 2 pages.

EP17844503.7, "Extended European Search Report", dated Aug. 22, 2019, 8 pages.

\* cited by examiner

CONTINUOUS TIME WARP AND BINOCULAR TIME WARP FOR VIRTUAL AND AUGMENTED REALITY DISPLAY SYSTEMS AND METHODS

CROSS-REFERENCES TO RELATED APPLICATIONS

This application is a continuation of and claims the benefit of U.S. patent application Ser. No. 15/686,885 titled "Continuous Time Warp and Binocular Time Warp for Virtual and Augmented Reality Display Systems and Methods", filed on Aug. 25, 2017, which is a non-provisional of and claims the benefit of U.S. Patent Application No. 62/380,302 titled "Time Warp for Virtual and Augmented Reality Display Systems and Methods", filed on Aug. 26, 2016, which are herein incorporated by reference in their entirety for all purposes. This application incorporates by reference in their entirety each of the following U.S. Patent Applications: U.S. Provisional Application No. 62/313,698 filed on Mar. 25, 2016, U.S. patent application Ser. No. 14/331,218 filed on Jul. 14, 2014; U.S. patent application Ser. No. 14/555,585 filed on Nov. 27, 2014; U.S. patent application Ser. No. 14/690,401 filed on Apr. 18, 2015; U.S. patent application Ser. No. 14/726,424 filed on May 29, 2015; U.S. patent application Ser. No. 14/726,429 filed on May 29, 2015; U.S. patent application Ser. No. 15/146,296 filed on May 4, 2016; U.S. patent application Ser. No. 15/182,511 filed on Jun. 14, 2016; U.S. patent application Ser. No. 15/182,528 filed on Jun. 14, 2016; U.S. Patent Application No. 62/206,765 filed on Aug. 18, 2015; U.S. patent application Ser. No. 15/239,710 filed on Aug. 18, 2016; U.S. Provisional Application No. 62/377,831 filed on Aug. 22, 2016 and U.S. Provisional Application No. 62/380,302 filed on Aug. 26, 2016.

FIELD OF THE INVENTION

The present disclosure relates to virtual reality and augmented reality visualization systems. More specifically, the present disclosure relates to continuous time warp and binocular time warp methods for virtual reality and augmented reality visualization systems.

BACKGROUND

Modern computing and display technologies have facilitated the development of systems for so called "virtual reality" (VR) or "augmented reality" (AR) experiences, wherein digitally reproduced images, or portions thereof, are presented to a user in a manner wherein the images seem to be, or may be perceived as, real. A VR scenario typically involves presentation of digital or virtual image information without transparency to other actual real-world visual input. An AR scenario typically involves presentation of digital or virtual image information as an augmentation to visualization of the actual world around the user.

For example, referring to Figure (FIG.) 1, an AR scene 4 is depicted wherein a user of an AR technology sees a real-world park-like setting 6 featuring people, trees, buildings in the background, and a concrete platform 8. In addition to these items, the user of the AR technology also perceives that they "see" a robot statue 10 standing upon the real-world concrete platform 8, and a cartoon-like avatar character 2 flying by which seems to be a personification of a bumble bee, even though these elements (e.g., the avatar character 2, and the robot statue 10) do not exist in the real-world. Due to the extreme complexity of the human visual perception and nervous system, it is challenging to produce a VR or AR technology that facilitates a comfortable, natural-feeling, rich presentation of virtual image elements amongst other virtual or real-world imagery elements.

One major problem is directed to modifying the virtual image displayed to the user based on user movement. For example, when the user moves their head, their area of vision (e.g., field of view) and the perspective of the objects within the area of vision may change. The overlay content that will be displayed to the user needs to be modified in real time, or close to real time, to account for the user movement to provide a more realistic VR or AR experience.

A refresh rate of the system governs a rate at which the system generates content and displays (or sends for display) the generated content to a user. For example, if the refresh rate of the system is 60 Hertz, the system generates (e.g., renders, modifies, and the like) content and displays the generated content to the user every 16 milliseconds. VR and AR systems may generate content based on a pose of the user. For example, the system may determine a pose of the user, generate content based on the determined pose, and display the generated content to the user all within the 16 millisecond time window. The time between when the system determines the pose of the user and when the system displays the generated content to the user is known as "motion-to-photon latency." The user may change their pose in the time between when the system determines the pose of the user and when the system displays the generated content. If this change is not accounted for, it may result in an undesired user experience. For example, the system may determine a first pose of the user and begin to generate content based on the first pose. The user may then change their pose to a second pose in the time between when the system determines the first pose and subsequently generates content based on the first pose, and when the system displays the generated content to the user. Since the content is generated based on the first pose and the user now has the second pose, the generated content displayed to the user will appear misplaced with respect to the user because of pose mismatch. The pose mismatch may lead to an undesired user experience.

The systems may apply a correction to account for the user change in the user pose over an entire rendered image frame for example, as a post-processing step operating on a buffered image. While this technique may work for panel displays that display an image frame by flashing/illuminating all pixels (e.g., in 2 ms) when all pixels are rendered, this technique may not work well with scanning displays that display image frames on a pixel-by-pixel basis (e.g., in 16 ms) in a sequential manner. In scanning displays that display image frames on a pixel-by-pixel basis in a sequential manner, a time between a first pixel and a last pixel can be up to a full frame duration (e.g., 16 ms for a 60 Hz display) during which the user pose may change significantly.

Embodiments address these and other problems associated with VR or AR systems implementing conventional time warp.

SUMMARY OF THE INVENTION

This disclosure relates to technologies enabling three-dimensional (3D) visualization systems. More specifically, the present disclosure address components, sub-components, architectures, and systems to produce augmented reality ("AR") content to a user through a display system that permits the perception of the virtual reality ("VR") or AR content as if it is occurring in the observed real world. Such immersive sensory input may also be referred to as mixed reality ("MR").

In some embodiments, a light pattern is injected into a waveguide of a display system configured to present content to the user wearing the display system. The light pattern may be injected by a light projector, and the waveguide may be configured to propagate light of a particular wavelength through total internal reflection within the waveguide. The light projector may include light emitting diodes (LEDs) and a liquid crystal on silicon (LCOS) system. In some embodiments, the light projector may include a scanning fiber. The light pattern may include image data in a time-sequenced manner.

Various embodiments provide continuous and/or binocular time warping methods to account for head movement of the user and to minimize the motion-to-photon latency resulting from the head movement of the user. Continuous time warping allows for transformation of an image from a first perspective (e.g., based on a first position of the user's head) to a second perspective (e.g., based on a second position of the user's head) without having to re-render the image from the second perspective. In some embodiments, the continuous time warp is performed on an external hardware (e.g., a controller external to the display), and, in other embodiments, the continuous time warp is performed on internal hardware (e.g., a controller internal to the display). The continuous time warp is performed before a final image is displayed at the display device (e.g., a sequential display device).

Some embodiments provide a method for transforming an image frame based on an updated position of a viewer. The method may include obtaining, by a computing device from a graphics processing unit, a first image frame. The first image frame corresponds to a first view perspective associated with a first position of the viewer. The method may also include receiving data associated with a second position of the viewer. The computing device may continuously transform at least a portion of the first image frame pixel-by-pixel to generate a second image frame. The second image frame corresponds to a second view perspective associated with the second position of the viewer. The computing device may transmit the second image frame to a display module of a near-eye display device to be displayed on the near-eye display device.

Various embodiments provide a method for transforming an image frame based on an updated position of a viewer. The method may include rendering, by a graphics processing unit at a first time, a left image frame for a left display of a binocular near-eye display device. The left image frame corresponds to a first view perspective associated with a first position of the viewer. The method may also include rendering, by a computing device from the graphics processing unit, a right image frame for a right display of the binocular near-eye display device. The right image frame corresponds to the first view perspective associated with the first position of the viewer. The graphics processing unit may receive, at a second time later than the first time, data associated with a second position of the viewer. The data includes a first pose estimation based on the second position of the viewer. The graphics processing unit may transform at least a portion of the left image frame using the first pose estimation based on the second position of the viewer to generate an updated left image frame for the left display of the binocular near-eye display device. The updated left image frame corresponds to a second view perspective associated with the second position of the viewer. The graphics processing unit may transmit, at a third time later than the second time, the updated left image frame to the left display of the binocular near-eye display device to be displayed on the left display. The graphics processing unit may receive, at a fourth time later than the second time, data associated with a third position of the viewer. The data includes a second pose estimation based on the third position of the viewer. The graphics processing unit may transform, at least a portion of the right image frame using the second pose estimation based on the third position of the viewer to generate an updated right image frame for the right display of the binocular near-eye display device. The updated right image frame corresponds to a third view perspective associated with the third position of the viewer. The graphics processing unit may transmit, at a fifth time later than the fourth time, the updated right image frame to the right display of the binocular near-eye display device to be displayed on the right display.

Embodiments may include a computing system including at least a graphics processing unit, a controller and a near-eye display device for performing the method steps described above.

Additional features, benefits, and embodiments are described below in the detailed description, figures, and claims.

BRIEF DESCRIPTION OF THE DRAWINGS

Figure (FIG.) 1 illustrates an augmented reality ("AR") scene as viewed through a wearable AR device, according to some embodiments.

DETAILED DESCRIPTION OF SPECIFIC EMBODIMENTS

Figure 2:
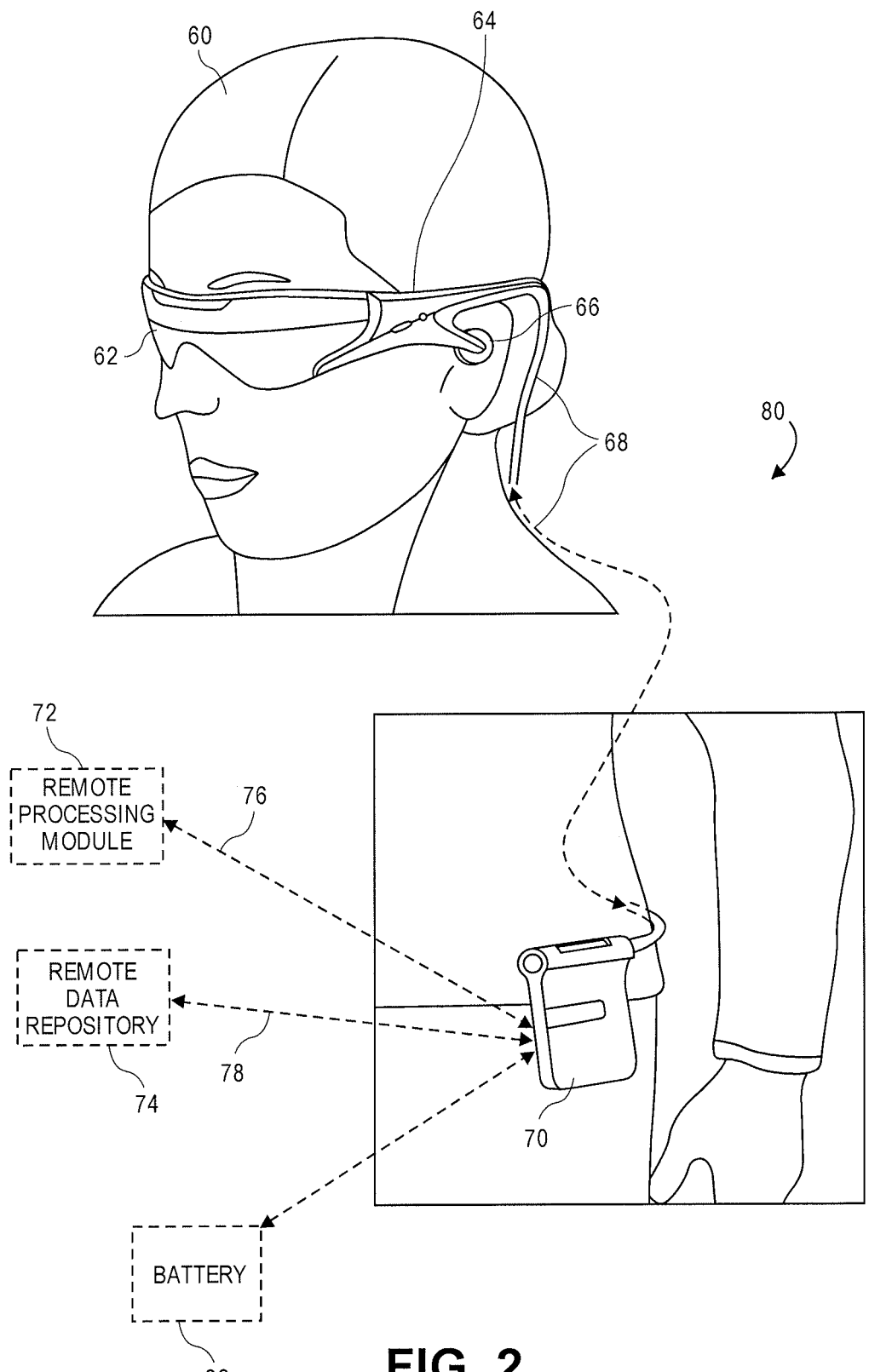
FIG. 2 illustrates a wearable AR display system, according to some embodiments.

A virtual reality ("VR") experience may be provided to a user through a wearable display system. FIG. 2 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular. In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control. The display device 62 is operatively coupled 68, such as by a wired lead or wireless connectivity, to a local data processing module 70 which may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration).

The local data processing module 70 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70.

In some embodiments, the local data processing module 70 may include one or more processors (e.g., a graphics processing unit (GPU)) configured to analyze and process data and/or image information. In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

Figure 3A:
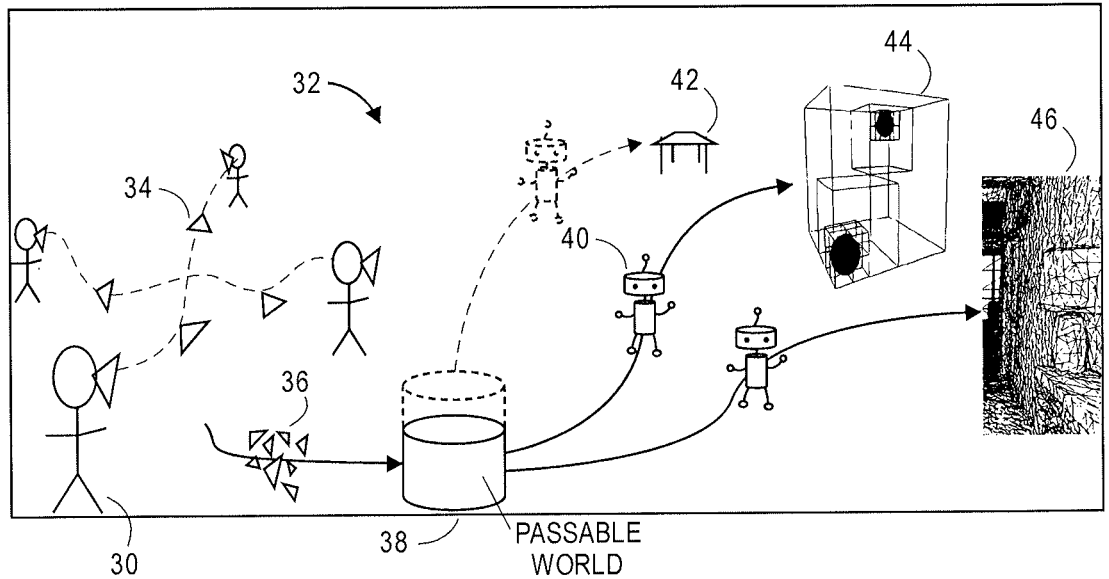
FIG. 3A illustrates an interaction of a user of an AR display system interacting with a real world environment, according to some embodiments.

FIG. 3A illustrates a user 30 wearing an augmented reality ("AR") display system rendering AR content as the user 30 moves through a real world environment 32 (hereinafter referred to as "environment 32"). The user 30 positions the AR display system at positions 34, and the AR display system records ambient information of a passable world (e.g., a digital representation of the objects in the real-world that can be stored and updated with changes to the objects in the real-world) relative to the positions 34 such as pose relation to mapped features or directional audio inputs. The positions 34 are aggregated to data inputs 36 and processed at least by a passable world module 38, such as the remote processing module 72 of FIG. 2. The passable world module 38 determines where and how AR content 40 can be placed in the real world as determined from the data inputs 36, such as on a fixed element 42 (e.g., a table) or within structures not yet within a field of view 44 or relative to mapped mesh model 46 of the real world. As depicted, the fixed element 42 serves as a proxy for any fixed element within the real world which may be stored in passable world module 38 so that the user 30 can perceive content on the fixed element 42 without having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

Similarly, the mapped mesh model 46 of the real world can be created by the AR display system and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Figure 3B:
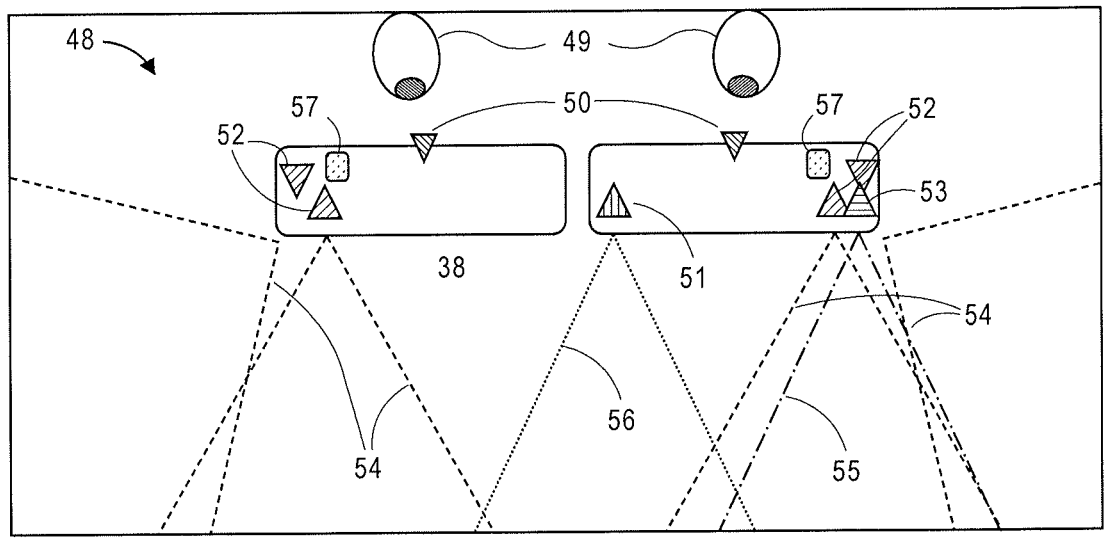
FIG. 3B illustrates components to a viewing optics assembly, according to some embodiments.

FIG. 3B illustrates a schematic of a viewing optics assembly 48 and attendant components. Oriented to user eyes 49, in some embodiments, two eye tracking cameras 50 detect metrics of the user eyes 49 such as eye shape, eyelid occlusion, pupil direction and glint on the user eyes 49. In some embodiments, a depth sensor 51, such as a time of flight sensor, emits relay signals to the world to determine distance to given objects. In some embodiments, world cameras 52 record a greater-than-peripheral view to map the environment 32 and detect inputs that may affect AR content. Camera 53 may further capture a specific timestamp of real world images within a field of view of the user. Each of the world cameras 52, the camera 53 and the depth sensor 51 have respective fields of view of 54, 55, and 56 to collect data from and record a real world scene, such as real world environment 32 depicted in FIG. 3A.

Inertial measurement units 57 may determine movement and orientation of the viewing optics assembly 48. In some embodiments, each component is operatively coupled to at least one other component. For example, the depth sensor 51 is operatively coupled to the eye tracking cameras 50 as a confirmation of measured accommodation against actual distance the user eyes 49 are looking at.

In an AR system, when the position of the user 30 changes, the rendered image need to be adjusted to account for the new area of view of the user 30. For example, referring to FIG. 2, when the user 60 moves their head, the images displayed on the display device 62 need to be updated. However, there may be a delay in rendering the images on the display device 62 if the head of the user 60 is in motion and the system 80 needs to determine new perspective views to the rendered images based on new head poses.

According to various embodiments, the image to be displayed may not need to be re-rendered to save time. Rather, the image may be transformed to agree with the new perspective (e.g., new are of view) of the user 60. This rapid image readjustment/view correction may be referred as time warping. Time warping may allow the system 80 to appear more responsive and immersive even as the head position, and hence the perspective, of the user 60 changes.

Time warping may be used to prevent unwanted effects, such as tearing, on the displayed image. Image tearing is a visual artifact in the display device 62 where the display device 62 shows information from multiple frames in a single screen draw. Tearing may occur when the frame transmission rate to the display device 62 is not synchronized with the refresh rate of the display device 62.

Figure 1:
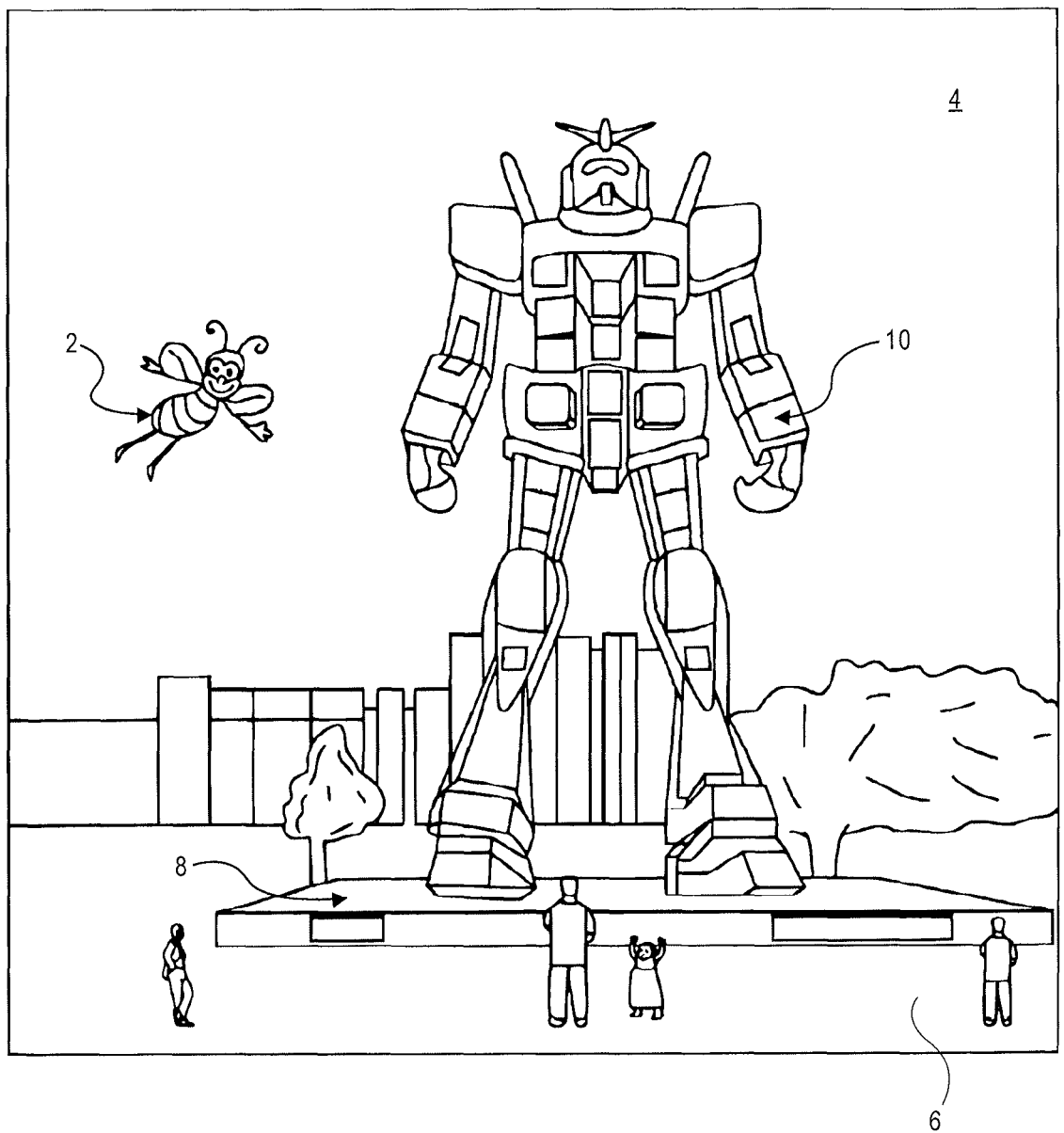
Figure 4:
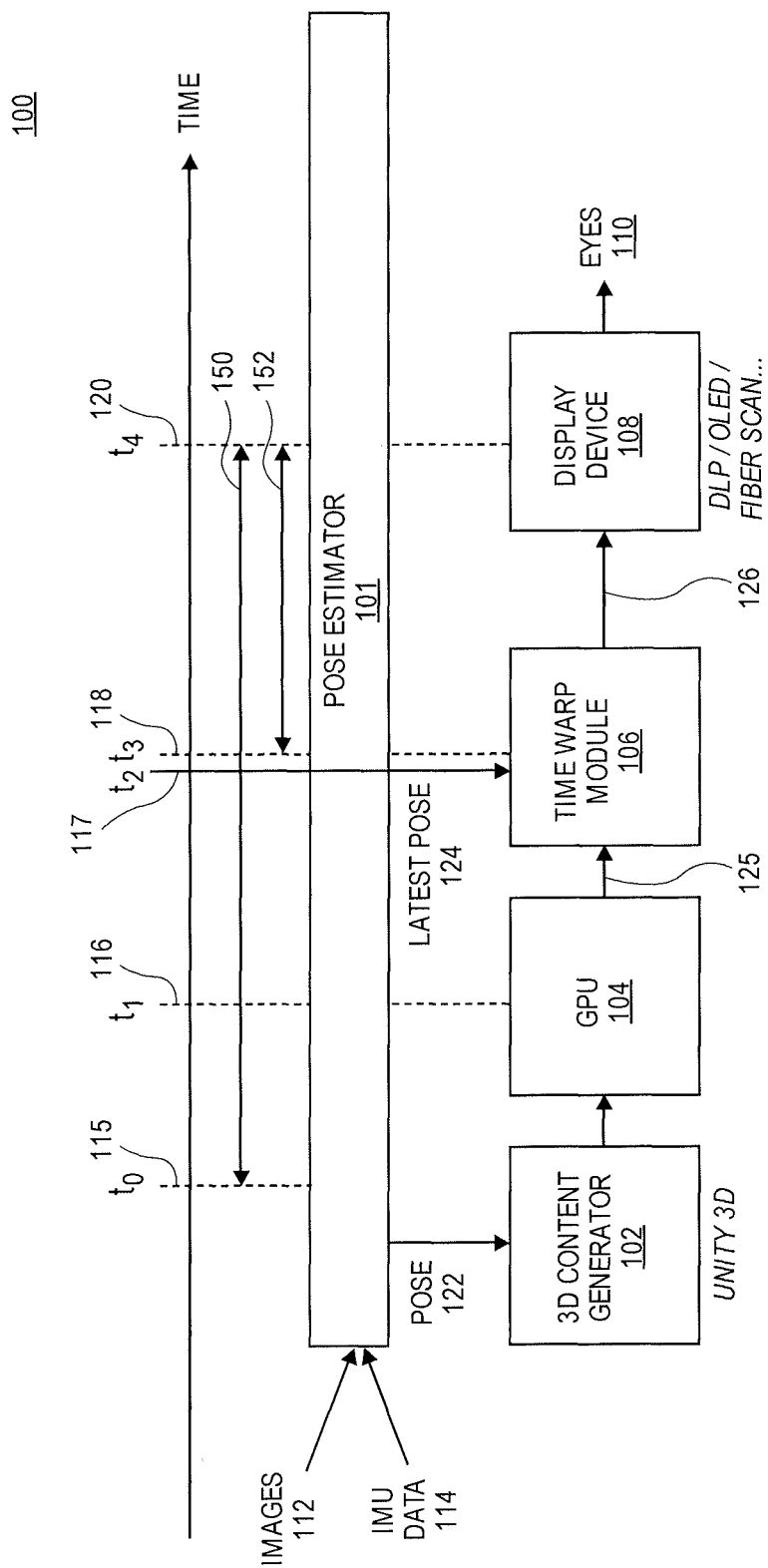
FIG. 4 illustrates time warp, according to one embodiment.

FIG. 4 illustrates how time warp may be performed once 3D content is rendered. A system 100 illustrated in FIG. 4 includes a pose estimator 101 that receives image data 112 and inertial measurement unit (IMU) data 114 from one or more IMUs. The pose estimator 101 may then generate a pose 122 based on the received image data 112 and IMU data 114, and provide the pose 122 to a 3D content generator 102. The 3D content generator 102 may generate 3D content (e.g., 3D image data) and provide the 3D content to a graphics processing unit (GPU) 104 for rendering. The GPU 104 may render the received 3D content at time t1 116, and provide a rendered image 125 to a time warp module 106. The time warp module 106 may receive the rendered image 125 from the GPU 104 and a latest pose 124 from the pose estimator 101 at time t2 117. The time warp module 106 may then perform time warp on the rendered image 125 using the latest pose 124 at time t3 118. A transformed image 126 (i.e., the image where the time warp is performed) is sent to a display device 108 (e.g., the display device 62 of FIG. 1). Photons are generated at the display device 108 and emitted toward eyes 110 of the user, thereby displaying an image on the display device 108 at time t4 120. The time warps illustrated in FIG. 4 enables to present latest pose update information (e.g., the latest pose 124) on the image displayed on the display device 108. The old frame (i.e., the previously displayed frame or the frame received from the GPU) may be used to interpolate for time warp. With the time warp, the latest pose 124 can be incorporated in the displayed image data.

In some embodiments, the time warp may be a parametric warp, a non-parametric warp, or an asynchronous warp. Parametric warping involves affine operations like translation, rotation and scaling of an image. In parametric warping, pixels of the image are repositioned in a uniform manner. Accordingly, while the parametric warping may be used to correctly update a scene for rotation of the head of the user, the parametric warping may not account for translation of the head of the user, where some regions of the image may be affected differently than others.

Non-parametric warping involves non-parametric distortions of sections of the image (e.g., stretching of portions of an image). Even though the non-parametric warping may update pixels of the image differently in different regions of the image, the non-parametric warping may only partly account for translation of the head of the user due to a notion referred as "disocclusion". Disocclusion may refer to an exposure of an object to view, or a reappearance of an object previously hidden from view, for example, as a result of a change in the pose of the user, removal of an obstruction in the line of sight, and the like.

The asynchronous time warp may refer to warping that separates scene rendering and time-warping into two separate, asynchronous operations. The asynchronous time warp may be executed on the GPU or on external hardware. The asynchronous time warp may increase the frame rate of the displayed image above a rendering rate.

According to various embodiments, the time warp may be performed in response to a new head position (i.e., an imputed head pose) of a user. For example, as illustrated at FIG. 4, the user may move their head (e.g., user rotates, translates, or both) at time t0 115. As a result, the perspective of the user may change. This will result in changes in what the user sees. Accordingly, the rendered image needs to be updated to account for the user's head movement for a realistic VR or AR experience. That is, the rendered image 125 is warped to align (e.g., correspond) to the new head position so that the user perceives virtual content with the correct spatial positioning and orientation relative to the user's perspective in the image displayed at the display device 108. To that end, embodiments aim at reducing the motion-to-photon latency, which is the time between the time when the user moves their head and the time when the image (photons) incorporating this motion lands on the retina of the user. Without time warping, the motion-to-photon latency is the time between the time when the user causes the motion captured in the pose 122 and the time when the photons are emitted toward the eyes 110. With time warping, the motion-to-photon latency is the time between the time when the user causes the motion captured in the latest pose 124 and the time when the photons are emitted toward the eyes 110. In an attempt to reduce errors due to motion-to-photon latency, a pose estimator may predict a pose of the user. The further out, in time, the pose estimator predicts the pose of the user, also known as the prediction horizon, the more uncertain the prediction. Conventional systems that do not implement time warp in the manners disclosed here traditionally have a motion-to-photon latency of at least one frame duration or greater (e.g., at least 16 milliseconds or greater for 60 Hz). Embodiments achieve a motion-to-photon latency of about 1-2 milliseconds.

Embodiments disclosed herein are directed to two non-mutually exclusive types of time warp: continuous time warp (CTW) and staggered binocular time warp (SBTW). Embodiments may be used along with a display device (e.g., the display device 62 of FIG. 1) using a scanning fiber or any other scanning image source (e.g., microelectromechanical systems (MEMS) mirror) as the image source. The scanning fiber relays light from remote sources to the scanning fiber via single mode optical fiber. The display device uses an actuating fiber optic cable to scan out images much larger than the aperture of the fiber itself. The scanning fiber approach is not bound by scan-in starting time and scan-out starting time, and that there can be transformations between the scan-in starting time and the scan-out starting time (e.g., before images can be uploaded to the display device). Instead, a continuous time warp can be performed in which the transformation is done pixel-by-pixel basis and an x-y location, or even an x-y-z location, of a pixel is adjusted as the image is sliding by the eye.

Various embodiments discussed herein may be performed using the system 80 illustrated in FIG. 2. However, embodiments are not limited to the system 80 and may be used in connection with any system capable of performing the time warp methods discussed herein.

Perspective Adjustment and Warping

According to various embodiments, an AR system (e.g., the system 80) may use a 2-dimensional (2D) see-through display (e.g., the display device 62). To represent 3-dimensional (3D) objects on the display, the 3D objects may need to be projected onto one or more planes. The resulting image at the display may depend on a view perspective of a user (e.g., the user 60) of the system 80 looking at the 3D object via the display device 62. Figures (FIGS.) 5-7 illustrate the view projection by showing the movement of the user 60 with respect to 3D objects, and what the user 60 sees in each position.

Figure 5:
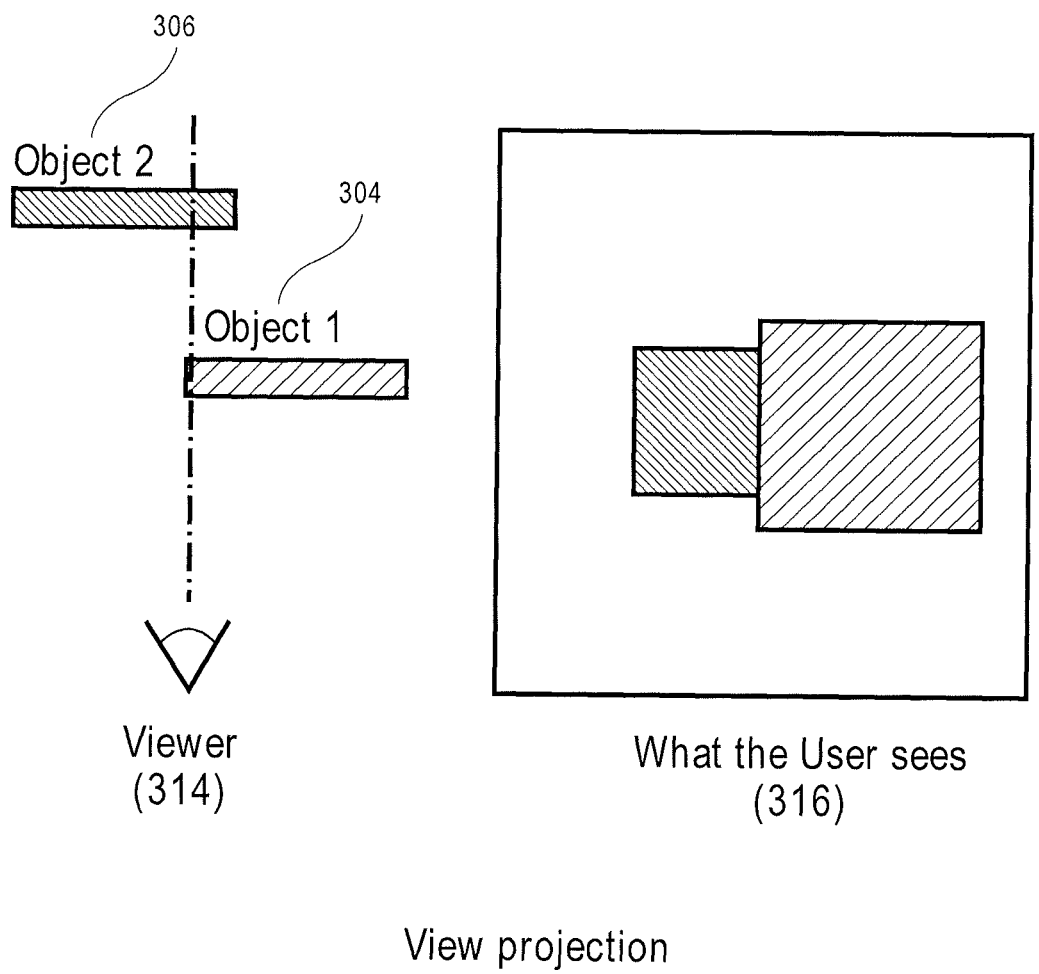
FIG. 5 illustrates a view area of a viewer from an initial position, according to one embodiment.

FIG. 5 illustrates a view area of a user from a first position. A user sees a first 3D object 304 and a second 3D object 306 as illustrated in "what the user sees 316" when the user is positioned at a first position 314. From the first position 314, the user sees the first 3D object 304 in its entirety and a portion of the second 3D object 306 is obfuscated by the first 3D object 304 placed in front of the second 3D object 306.

Figure 6:
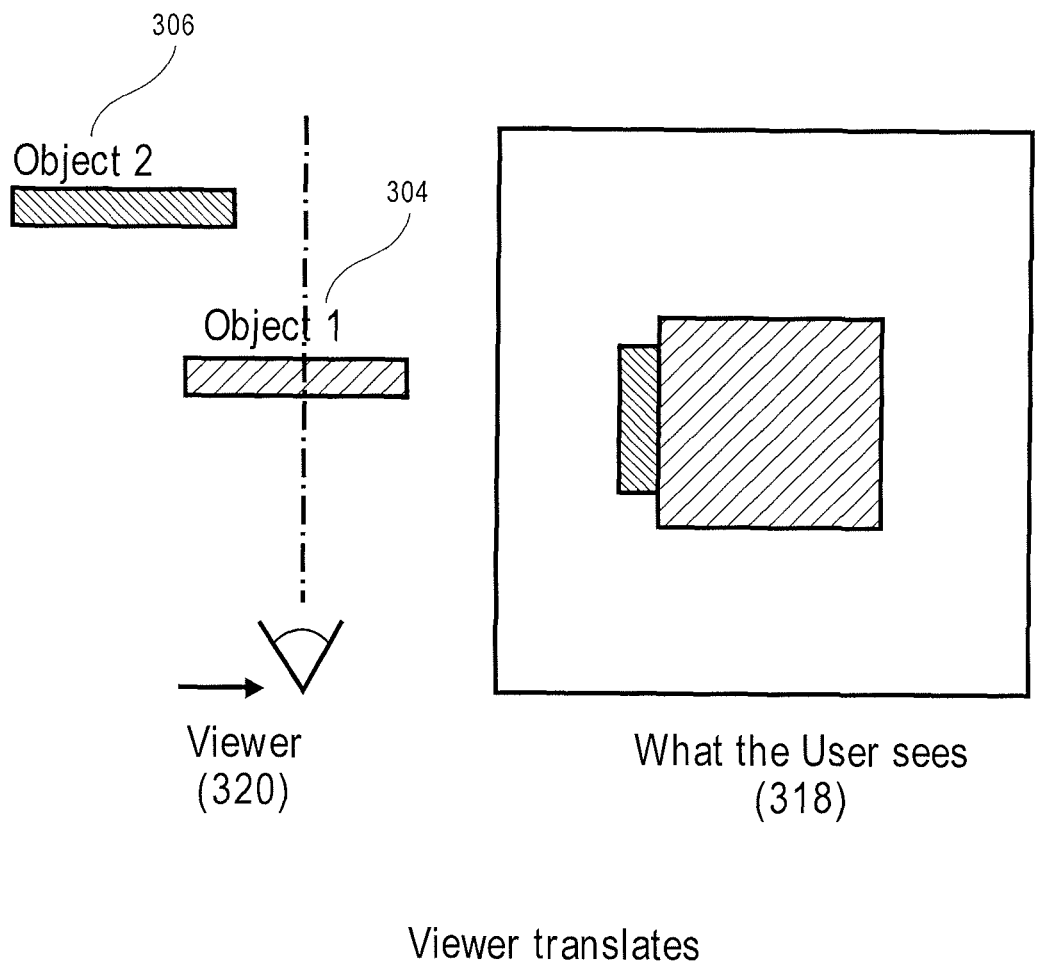
FIG. 6 illustrates a view area of a viewer from a second position due to translation of the viewer, according to one embodiment.

FIG. 6 illustrates a view area of the user from a second position. When the user translates (e.g., moves sideways) with respect to the first position 314 of FIG. 5, the perspective of the user changes. Accordingly, the features of the first 3D object 304 and the second 3D object 306 that are visible from a second portion 320 may be different from the features of the first 3D object 304 and the second 3D object 306 that were visible from the first position 314. In the example illustrated in FIG. 6, when the user translates sideways away from the second 3D object 306 and towards the first 3D object 304, the user sees that the first 3D object 304 obfuscates a larger portion of the second 3D object 304 compared to the view from the first position 314. The user sees the first 3D object 304 and the second 3D object 306 as illustrated in "what the user sees 318" when the user is positioned at the second position 320. According to various embodiments, when the user translates sideways in the manner illustrated in FIG. 6, "what user sees 318" updates non-uniformly (i.e., objects closer to the user (e.g., the first 3D object 304) appear to move more than distant objects (e.g., the second 3D object 306)).

Figure 7:
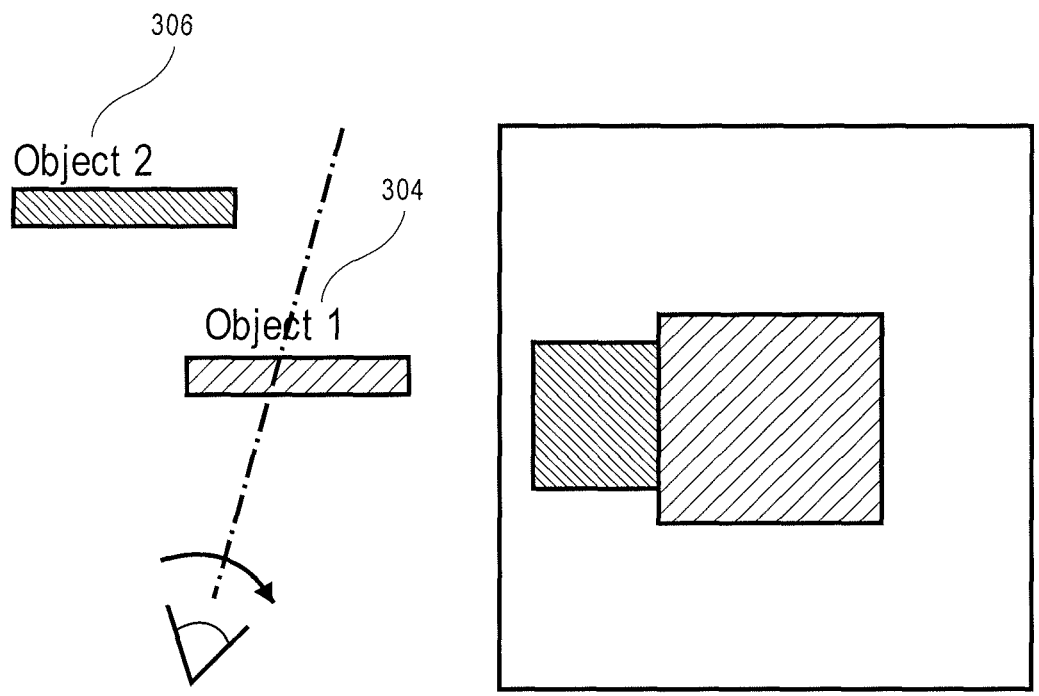
FIG. 7 illustrates a view area of a viewer from a third position due to rotation of the viewer, according to one embodiment.

FIG. 7 illustrates a view area of the user from a third position. When the user rotates with respect to the first position 314 of FIG. 5, the perspective of the user changes. Accordingly, the features of the first 3D object 304 and the second 3D object 306 that are visible from a third position 324 may be different from the features of the first 3D object 304 and the second 3D object 306 that are visible from the first position 314. In the example illustrated in FIG. 7, when the user rotates clockwise, the first 3D object 304 and the second 3D object 306 shift left compared to "what the user sees 316" from the first position 314. The user sees the first 3D object 304 and the second 3D object 306 as illustrated in "what the user sees 322" when the user is positioned at the third position 324. According to various embodiments, when the user rotates about an optical center (e.g., about a center of perspective), the projected image "what user sees 322" merely translates. The relative arrangement of the pixels do not change. For example, the relative arrangement of the pixels of "what the user sees 316" in FIG. 5 is the same as "what the user sees 322" FIG. 7.

FIGS. 5-7 illustrate how rendering of viewed objects depend on a position of the user. Modifying what the user sees (i.e., a rendered view) based on movement of the user influences the quality of the AR experience. In a seamless AR experience, pixels representing virtual objects should always appear spatially registered to the physical world (referred as "pixel-stick-to-world" (PStW)). For example, if a virtual coffee mug may be placed on a real table in an AR experience, the virtual mug should appear fixed on the table when the user looks around (i.e., changes perspective). If PStW is not achieved, the virtual mug will drift in space when the user looks around, thereby breaking the perception of the virtual mug being on the table. In this example, the real table is static with respect to the real world orientation, while the perspective of the user changes through changes in head pose of the user. Thus the system 80 may need to estimate the head pose (relative to world coordinates) to register the virtual objects to the real world, then draw/present photons of the virtual objects from the correct view perspective.

The incorporation of the correct view pose in the presented image is crucial to the PStW concept. This incorporation may happen at different points along a rendering pipeline. Typically, the PStW concept may be better achieved when time between a pose estimate and a presented image is short or when a pose prediction for a given prediction horizon is more accurate, as this would result in the presented image being as up-to-date as possible. That is, if the pose estimate becomes outdated by the time the image generated based on the pose estimate is displayed, the pixels will not stick to world, and PStW may not be achieved.

The relationship between pixel positions of "what the user sees 316" corresponding to the first position 314 of FIG. 5 and pixel positions of "what the user sees 318" corresponding to the second position 320 of FIG. 6 (i.e., a translated position), or "what the user sees 324" corresponding to the third position of FIG. 7 (i.e., a rotated position) may be referred as an image transformation, or warping.

Time Warping

Time warping may refer to a mathematical transform between 2D images corresponding to different perspectives (e.g., position of a user's head). When the position of the user's head changes, time warp may be applied to transform the displayed image to agree with a new perspective without having to re-render a new image. Accordingly, changes of the position of the user's head may be quickly accounted. Time warping may allow an AR system to appear more responsive and immersive as the user moves her head thereby modifying her perspective.

In an AR system, after a pose (e.g., a first pose) is estimated based on an initial position of a user, the user may move and/or change position, thereby changing what the user sees, and a new pose (e.g., a second pose) may be estimated based on the changed position of the user. A image rendered based on the first pose needs to be updated to be updated based on the second pose to account for the user's movement and/or change in position for a realistic VR or AR experience. In order to quickly account for this change, the AR system may generate the new pose. Time warp may be performed using the second pose to generate a transformed image that accounts for the user's movement and/or change in position. The transformed image is sent to the display device and displayed to the user. As explained above, the time warp transforms a rendered image and, as such, time warp works with existing image data. Accordingly, time warp may not be used to render an entirely new object. For example, if a rendered image shows a can, and the user moves their head far enough that the user should see a penny hidden behind the can, the penny may not be rendered using the time warp because the penny was not in view in the rendered image. However, time warp may be used to render the position of the can properly based on the new pose (e.g., according to a new point of view of the user).

The efficacy of time warping may depend on (1) accuracy of a new head pose (from which a time warp is calculated), i.e., quality of pose estimator/sensor fusion, if warping happens right before an image is displayed; (2) accuracy of pose prediction over a prediction horizon time, i.e., the quality of the pose predictor, if warping happens some time (prediction horizon) before the image is displayed; and (3) length of the prediction horizon time (e.g., shorter the better).

I. Time Warp Operations

Time warp operations may include late-frame time warp and/or asynchronous time warp. The late-frame time warp may refer to warping of a rendered image as late as possible in a frame generation period, before a frame including the rendered image (or time-warped version thereof) is presented at a display (e.g., the display device 62). The aim is to minimize projection error (e.g., the error in aligning the virtual world with the real world based on the user's view point) by minimizing time between when a pose of a user is estimated and when the rendered image corresponding to the pose of the user is viewed by user (e.g., motion/photon/pose estimate-to-photon latency). With late-frame time warp, the motion-to-photon latency (i.e., the time between when the pose of the user is estimated and when the rendered image corresponding to the pose of the user is viewed by the user) may be less than the frame duration. That is, the late-frame time warp may be performed quickly thereby providing a seamless AR experience. The late-frame time warp may be executed on a graphics processing unit (GPU). The late-frame time warp may work well with simultaneous/flash panel displays that display the entire pixels of a frame at the same time. However, the late-frame time warp may not work as well with sequential/scanning displays that display a frame pixel-by-pixel as the pixels are rendered. The late-frame time warp may be a parametric warp, a non-parametric warp, or an asynchronous warp.

Figure 8:
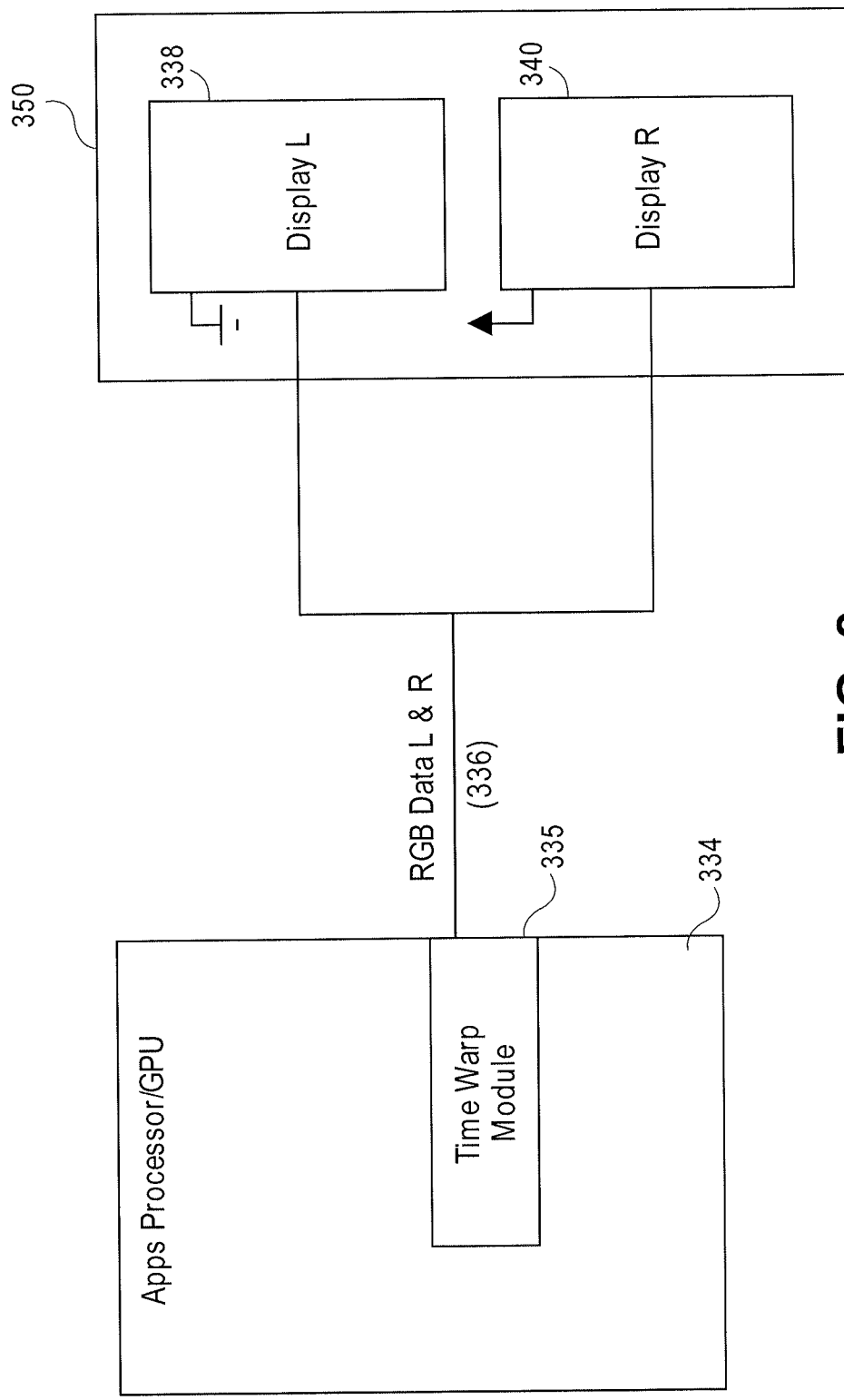
FIG. 8 illustrates a graphics processing unit (GPU) sending compressed image data to a display device.

FIG. 8 illustrates a system for performing late frame time warp, according to one embodiment. As illustrated 8, an applications processor/GPU 334 (hereinafter referred to as GPU 334) may perform time warp on image data before sending warped image data (e.g., Red-Green-Blue (RGB) data) 336 to a display device 350. In some embodiments, the image data 336 may be compressed image data. The display device may include a binocular display device. In this embodiment, the display device 350 may include a left display 338 and a right display 340. The GPU 334 may transmit the image data 336 to the left display 338 and right display 340 of the display device 350. The GPU 334 may have the ability to send sequential data per depth and may not collapse data into a 2D image. The GPU 334 includes a time warp module 335 for warping the image data 336 before transmission to the display device 350 (e.g., near-eye display such as LCOS).

Both the late-frame time warp and the asynchronous time warp may be executed on the GPU 334 and a transform domain (e.g., the portion of the image on which will be transformed) may include the entire image (e.g., the entire image is warped at the same time). After the GPU 334 warps the image, the GPU 334 sends the image to the display device 350 without further modifications. Accordingly, late-frame or asynchronous time-warp may be suited for applications on display devices including simultaneous/flashed displays (i.e., displays that illuminate all pixels at once). For such display devices, the entire frame must be warped (i.e., warping must be complete) by the GPU 334 before the left display 338 and the right display 340 of the display device 350 are turned on.

II. Continuous Time Warp

According to some embodiments, the GPU may render image data and output the rendered image data to an external component (e.g., an integrated circuit such as Field-Programmable Gate Array (FPGA)). The external component may perform a time warp on the rendered image and output the warped image to the display device. In some embodiments, the time warp may be a continuous time warp ("CTW"). The CTW may include progressively warping the image data at the external hardware up until right before the warped image data is transmitted from the external hardware to the display device where the warped image is converted to photons. An important feature of CTW is that continuous warping may be performed on sub-sections of the image data, as the image data is being streamed from the external hardware to the display device.

The continuous/streaming operation of CTW may be suited applications on display devices including sequential/scanning displays (i.e., displays that output lines or pixels over time). For such display devices, the streaming nature of the display device works in tandem with the streaming nature of CTW, resulting in time-efficiency.

Embodiments provide four exemplary continuous time warp methods: read cursor redirection, pixel redirection, buffer re-smear and write cursor redirection.

1. Read Cursor Redirection (RCRD) Method

As used herein, a display device pixel may refer to a display element/unit of a physical display device (e.g., a phosphor square on a CRT screen). As used herein, an image pixel may refer to the unit of digital representation (e.g., a 4-byte integer) of a computer-generated image. As used herein, an image buffer refers to a region of a physical memory storage used to temporarily store image data while the image data is being moved from one place (e.g., a memory or a hardware module external to GPU) to another (e.g., a display device).

According to various embodiments, the GPU may input rendered image data (e.g., image pixels) into the image buffer using a write cursor that scans the image buffer by advancing over time within the image buffer. The image buffer may output image pixels to a display device using a read cursor that may scan the image buffer by advancing over time within the image buffer.

For a display device including sequential/scanning displays, display device pixels may be turned on in a prescribed order (e.g., left to right, top to bottom). However, image pixels that are displayed on the display device pixels may vary. As each display device pixel is sequentially ready to turn on, the read cursor may advance through the image buffer, picking an image pixel that will be projected next. Without CTW, each display device pixel would always correspond to a same image pixel (e.g., an image is viewed with no modifications).

In embodiments implementing read cursor redirection ("RCRD"), the read cursor may continuously be redirected to select a different image pixel than a default image pixel. This results in warping of an output image. When using sequential/scanning displays, the output image may be output line by line, where each line may be individually warped so that the final output image that the user perceives is warped in the desired manner. The displacement of the read cursor and the image buffer may be relative to each other. That is, with RCRD, when the read cursor is redirected, the image data in the image buffer may shift. Redirecting the read cursor may be equivalent to translating the output image.

Figure 9:
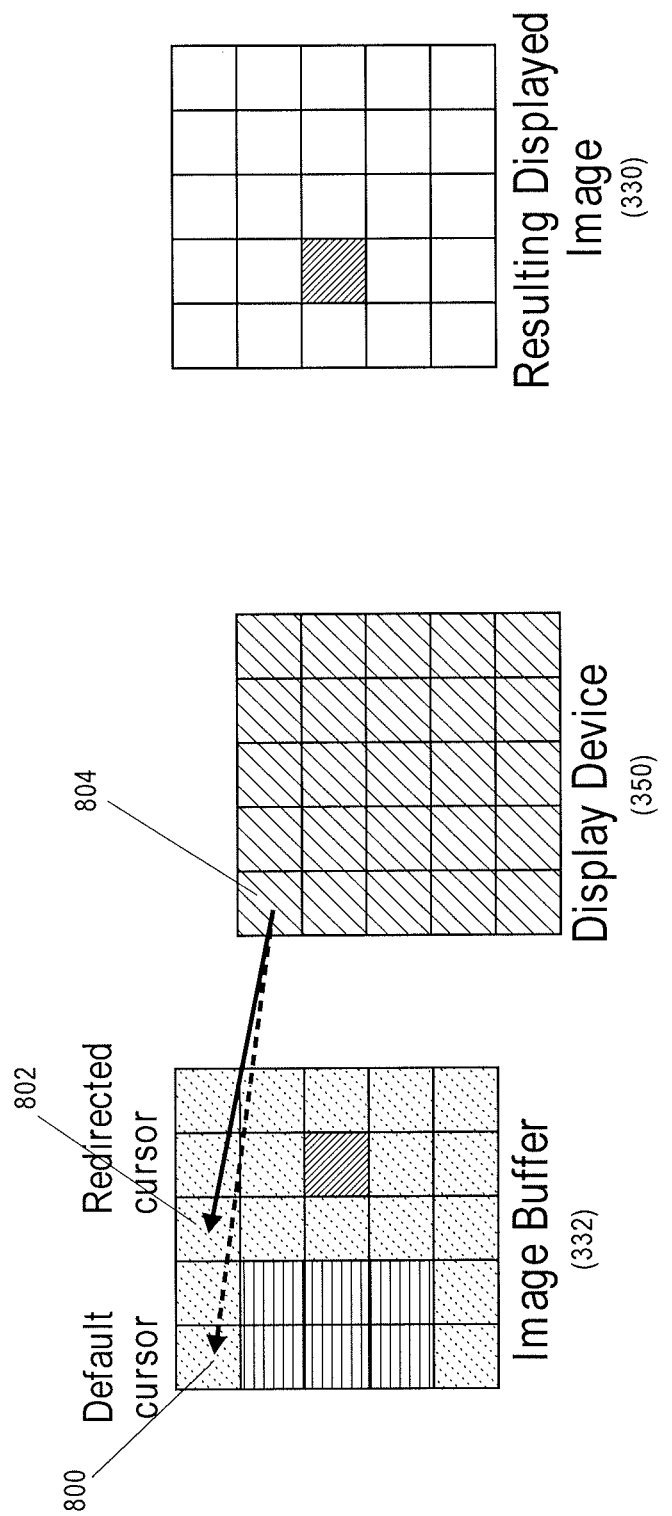
FIG. 9 illustrates read cursor redirection continuous time warp, according to one embodiment.

FIG. 9 illustrates a RCRD CTW method, according to one embodiment. A same redirection vector may be used for all display device pixels. A read cursor may be directed to select image pixel 800 from image buffer 332 to display at the corresponding display device pixel 804 of the display device 350. This may be referred to as a default position of the read cursor, or simply a default cursor. With RCRD, the read cursor may be redirected to select image pixel 802 of the image buffer 332 to display at the corresponding display device pixel 804 of the display device 350. This may be referred to as a redirected position of the read cursor, or simply a redirected cursor. As a result of RCRD, the read cursor selects the image pixel 802 of the image buffer 332 (as further explained below in connection with FIG. 11) and sends the selected image pixel 802 to the display device pixel 804 of the display device 350 for display. When the same redirection vector is applied to all display device pixels of the display device 350, the image data in the image buffer 332 is translated left by two columns. The image pixels of the image buffer 332 are warped and a resulting displayed image 330 is a translated version of the image data in the image buffer 332.

Figure 10:
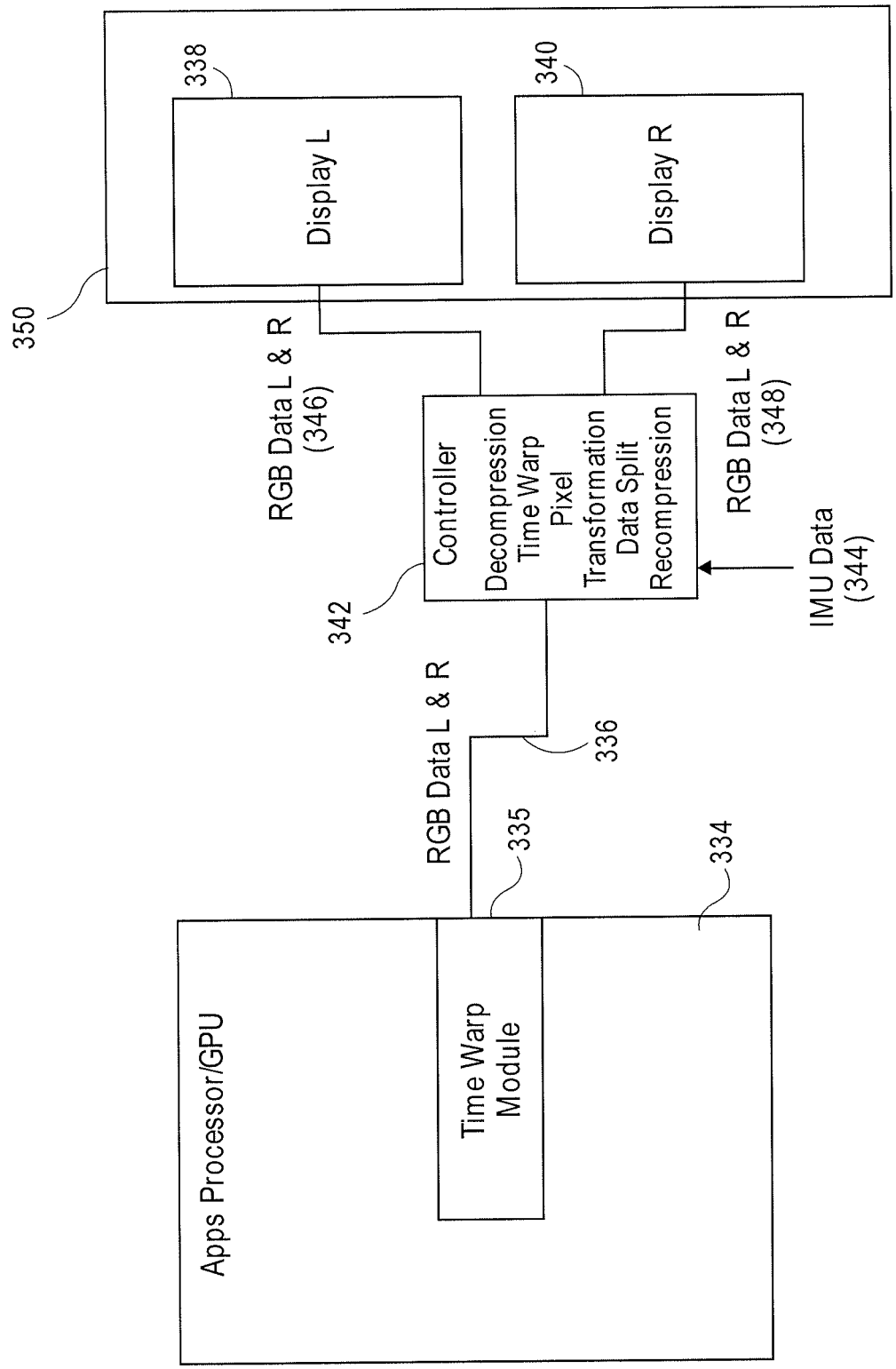
FIG. 10 illustrates an external controller unit between a GPU and a display device, according to one embodiment.

FIG. 10 illustrates a system for performing RCRD, according to one embodiment. An external (i.e., external to the GPU and the display device) controller 342 is provided between the GPU 334 and the display device 350. The GPU 334 may generate and send the image data 336 to the external controller 342 for further processing. The external controller 342 may also receive inertial measurement unit (IMU) data 344 from one or more IMUs. In some embodiments, the IMU data 344 may include viewer position data. The external controller 342 may decompress the image data 336 received from the GPU 334, apply a continuous time warp to the decompressed image data based on the IMU data 344, perform pixel transformation and data splitting, and re-compress the resulting data for sending to the display device 350. The external controller 342 may send image data 346 to the left display 338 and send image data 348 to the right display 340. In some embodiments, the image data 346 and the image data 348 may be compressed warped image data.

In some embodiments, both left rendered image data and right rendered image data may be sent to each of the left display 338 and the right display 340. Accordingly, the left display 338 and the right display 340 may perform additional accurate image rendering operations such as disocclusion using the additional image data. For example, the right display 340 may perform disocclusion using the left rendered image data in addition to the right rendered image data prior to rendering an image on the right display 340. Similarly, the left display 338 may perform disocclusion using the right rendered image data in addition to the left rendered image data prior to rendering an image on the left display 340.

Figure 11:
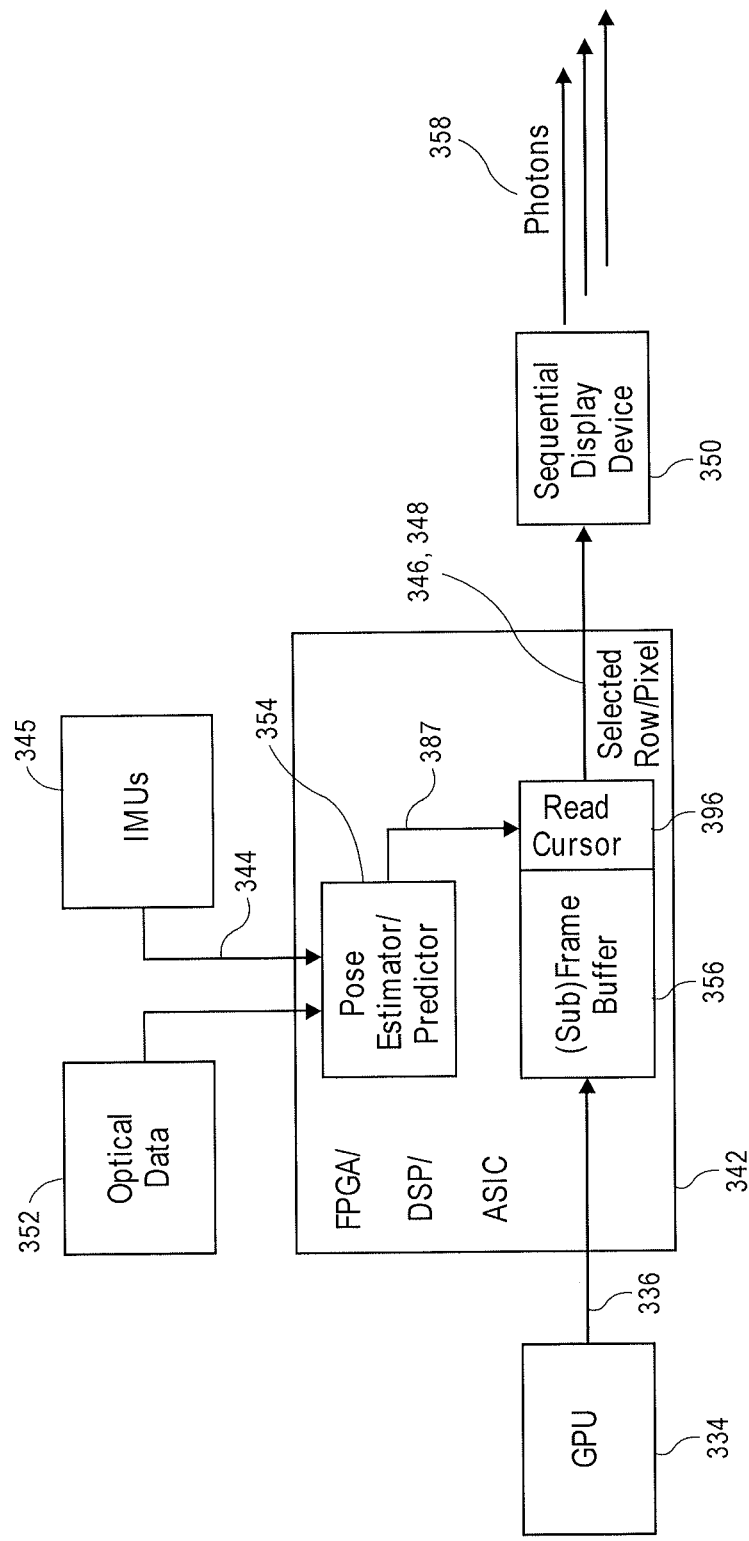
FIG. 11 illustrates an external controller unit as an external hardware unit in an architecture for performing read cursor redirection continuous time warp, according to one embodiment.

FIG. 11 illustrates the external controller 342 as an external hardware unit (e.g., a field-programmable gate array (FPGA), a digital signal processor (DSP), an application-specific integrated circuit (ASIC), etc.) between the GPU 334 and the display device 350 in a system architecture performing RCRD CTW. A pose estimator/predictor module 354 of the external controller 342 receives optical data 352 and IMU data 344 from one or more IMUs 345. The external controller 342 may receive the image data 336 from the GPU 334 and decompress the image data 336. The decompressed image data may be provided to a (sub)frame buffer 356 of the external controller 342. A read cursor redirection module 396 performs RCRD continuous time warp to transform the compressed image data 336 of the GPU 334 based on an output 387 of the pose estimator/predictor 354. The generated data 346, 348 is time warped image data which is then sent to the display device 350 to be transformed into photons 358 emitted toward the viewer's eyes.

i. (Sub)Frame Buffer Size

Figure 12:
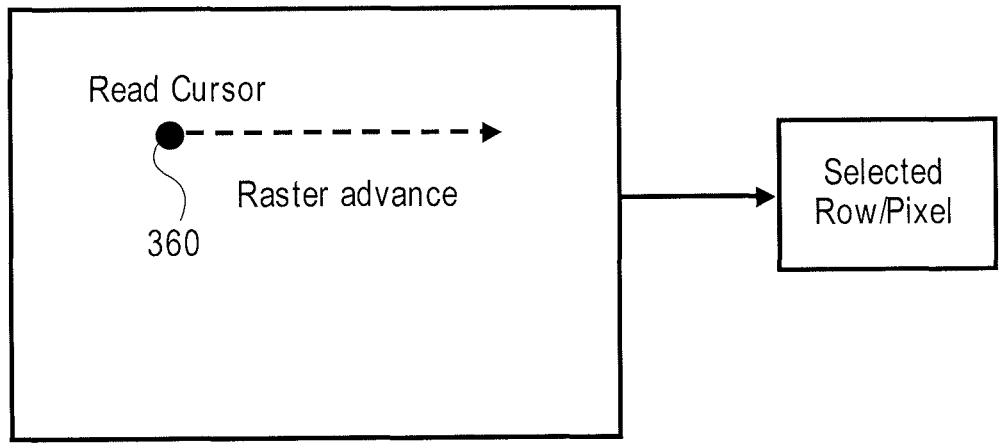
FIG. 12 illustrates read cursor advancing in raster mode, according to one embodiment.
Figure 13:
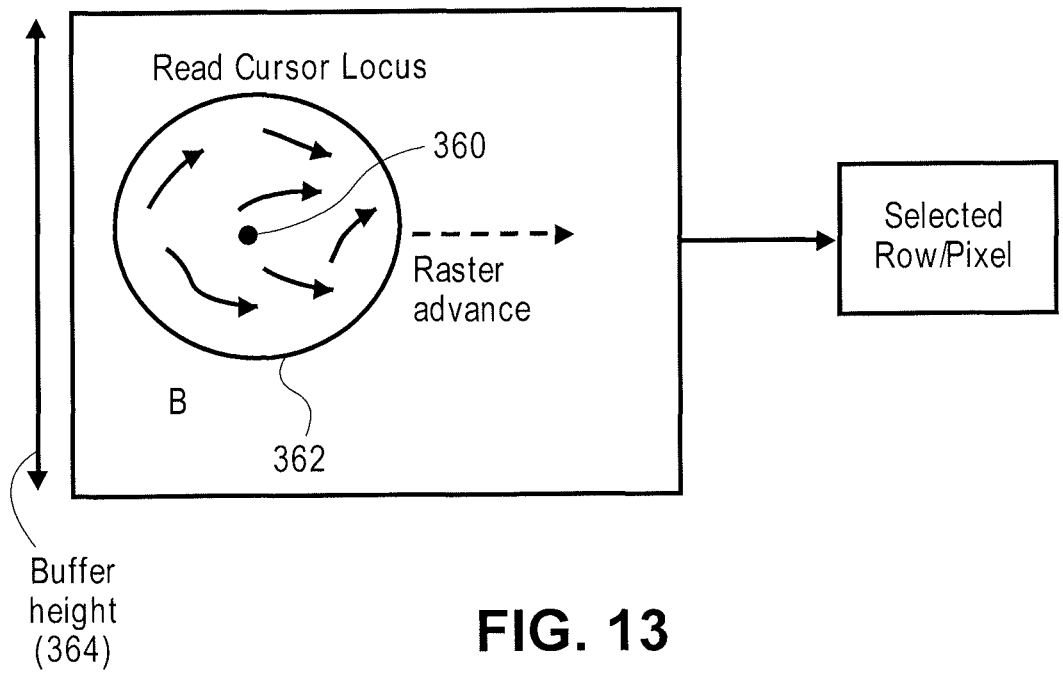
FIG. 13 illustrates read cursor advancing with read cursor redirection in raster mode, according to one embodiment.

Referring now to FIGS. 12 and 13, RCRD is discussed with respect to a size of a (sub)frame buffer (e.g., the (sub)frame buffer 356). According to some embodiments, the GPU 334 may produce raster images (e.g., an image as a dot matrix data structure) and the display device 350 may output raster images (e.g., the display device 350 may "raster out"). As illustrated in FIG. 12, a read cursor 360 (the cursor that advances through an image buffer picking an image pixel that will be projected next) may advance in a raster pattern through the (sub)frame buffer 356 without RCRD.

With RCRD as illustrated in FIG. 13, re-estimation of the viewer-pose right before displaying an image pixel may incorporate taking an image pixel about to be shown to the user from a different position in the buffered image instead of taking an image pixel from a default position. Given bounded head/eye movement, a locus of the redirected read-positions (i.e., different positions) is a closed set within a bounded area (e.g., a circle B) 362, around the read cursor 360. This locus is superposed with raster-advance momentum because the display device 350 is still rastering out the image. FIG. 13 shows that with continuous warp/pose re-estimation, read cursor trajectory is the superposition of the locus with the raster advance. A buffer height 364 of the (sub)frame buffer 356 needs to be equal to or greater than the diameter of the bounded area 362 to prevent the read cursor 360 extending beyond the boundaries of the (sub)frame buffer 356. Larger (sub)frame buffers may require additional processing time and computing power.

The diameter of the bounded area 362 is a function of a rendering rate of the display device 350, pose-prediction accuracy at render time, and maximum velocity of the user head movement. Accordingly, for a faster rendering rate, the diameter of the bounded area 362 decreases because a faster rendering rate results in less time being elapsed for the head pose to deviate from a pose assumption at render time. Thus, the redirection that may be required for the read cursor may be minor (e.g., the redirected read-position will be closer to the original read cursor position). In addition, for a more accurate pose-prediction at render time (e.g., when the image is rendered), the diameter of the bounded area 362 decreases because the required time-warp correction will be smaller. Thus, the redirection that may be required for the read cursor may be minor (e.g., the redirected read-position will be closer to the original read cursor position). Moreover, for a higher head movement velocity, the diameter of the bounded area 362 increases because the head pose can deviate more for a given time interval with fast head movement. Thus, the redirection that may be required for the read cursor may be substantial (e.g., the redirected read-position will be away from the original read cursor position).

ii. Read Cursor vs Write Cursor Position

Figure 14:
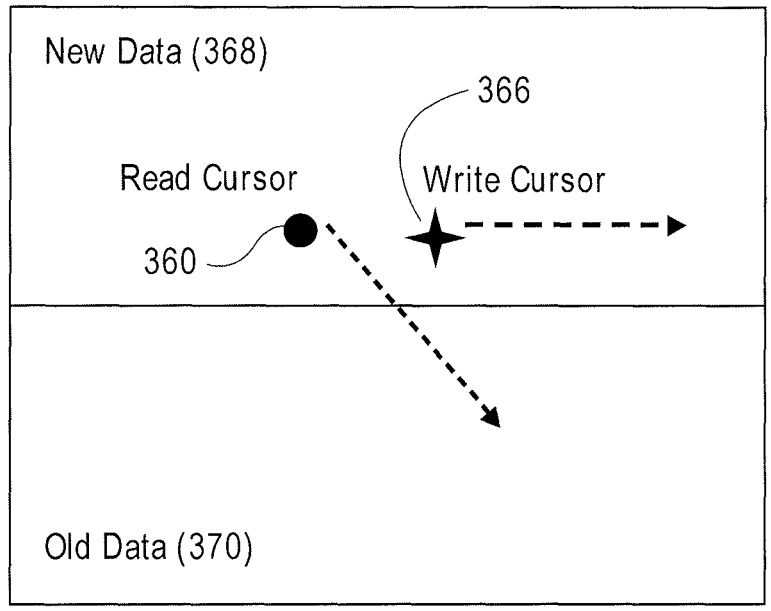
FIG. 14 illustrates region crossover by the read cursor, according to one embodiment.

According to some embodiments, the (sub)frame buffer 356 may also include a write cursor. Without read cursor redirection, the read cursor 360 may follow right behind a write cursor, for example, both moving in raster advance through the (sub)frame buffer 356. The (sub)frame buffer 356 may include a first region (e.g., new data region) for content rendered at one timestamp, and a second region (e.g., old data region) for content rendered at a previous timestamp. FIG. 14 illustrates the (sub)frame buffer 356 including a new data region 368 and an old data region 370. With RCRD, if the read cursor 360 that reads from the (sub)frame buffer 356 follows right behind a write cursor 366 that writes to the (sub)frame buffer 356, the locus of the redirected read-position (e.g., as depicted by the bounded area 362 of FIG. 13) may result in a "region crossover" where the read cursor 360 crosses into the old data region 370, as illustrated in FIG. 14. That is, the read cursor 360 may read the old data in the old data region 370 and may not be able retrieve the new data being written to the (sub)frame buffer 356 by the write cursor 366.

Figure 15:
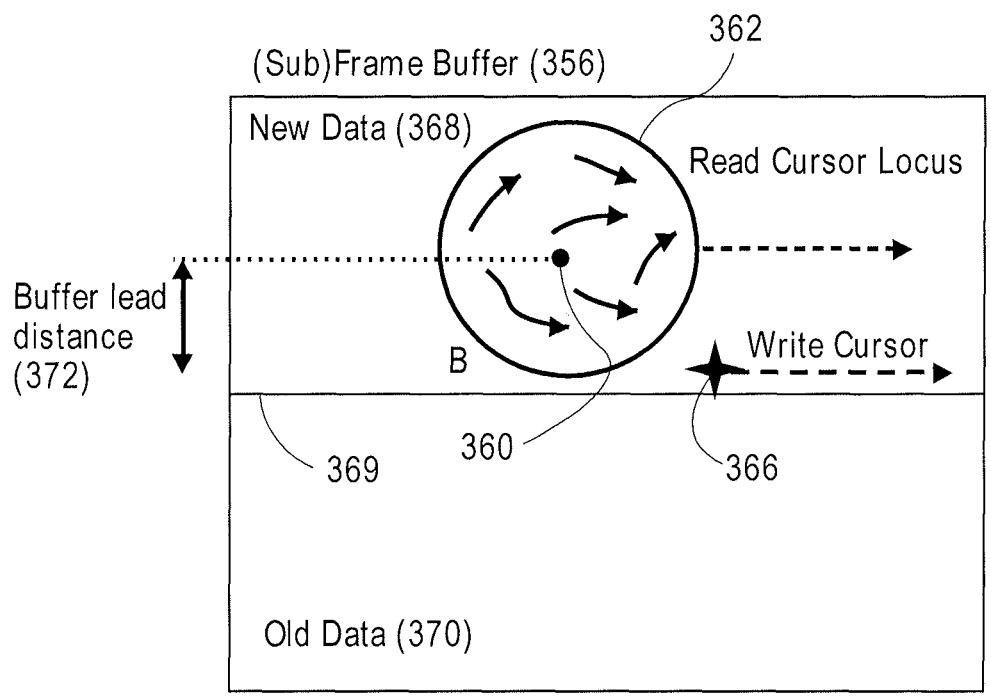
FIG. 15 illustrates buffer lead distance to prevent region crossover, according to one embodiment.

Region crossover may result in image tearing. For example if the images pixels in the (sub)frame buffer 356 include a depiction of a straight vertical line moving to the right and the read cursor 360 flits between two content renders (e.g., a first in the new data region 368 and a second in the old data 370) due to RCRD, the displayed line will not be straight, and will have tearing where the region crossover happens. Image tearing may be prevented by centering the read cursor 360 behind the write cursor 366 such that the bounded area 362 of redirected positions of the read cursor 360 is in the new data region 368, as illustrated in FIG. 15. This may be accomplished by setting a buffer lead distance 372 between the center of the bounded area 362 and a border 639 separating the new data region 368 from the old data region 370. The buffer lead distance 372 may force the bounded area 362 to stay in the new data region 368 entirely.

The repositioning of the read cursor 360 achieves a desired output image pixel orientation (i.e., the orientation of the image pixels is exact, regardless of the content punctuality). Accordingly, positioning the bounded area 362 behind the write cursor 366 does not adversely affect PStW or pose estimate/prediction-to-photon latency.

On the other hand, the buffer lead distance 372 may increase render-to-photon latency proportional to the buffer lead distance 372. The render-to-photon latency is the time between a scene render time, and an photon output time. A photon may have zero pose estimate/prediction-to-photon latency by a perfect time-warp, but render-to-photon latency may only be reduced by decreasing the time between the scene render and the photon output time. For example, for a 60 frames per second (fps) render rate, a default render-to-photon latency may be about 16 miliseconds (ms). 10 lines of buffer lead (e.g., the buffer lead distance 372) in a 1000 line image may only add 0.16 ms of render-to-photon latency. According to some embodiments, the render-to-photon latency increase may be removed if no buffer transmit time is required (e.g., if there is no write cursor) for example, when the external control 342 (e.g., FPGA) directly accesses the GPU 334 thereby eliminating the render-to-photon latency increase due to the transmission time between the GPU 334 and the external control 342.

iii. External Anti-Aliasing

Anti-aliasing is a view-dependent operation that is performed after time warping to avoid blurring artifacts. With CTW, anti-aliasing may be performed by the external hardware, right before photon generation. The external control 342 (e.g., FPGA) with direct access to the GPU 334 (or 2 coordinating GPUs) may be used for performing external anti-aliasing after continuous time warp and before photon generation to be displayed.

2. Buffer Re-Smear Method

Figure 16:
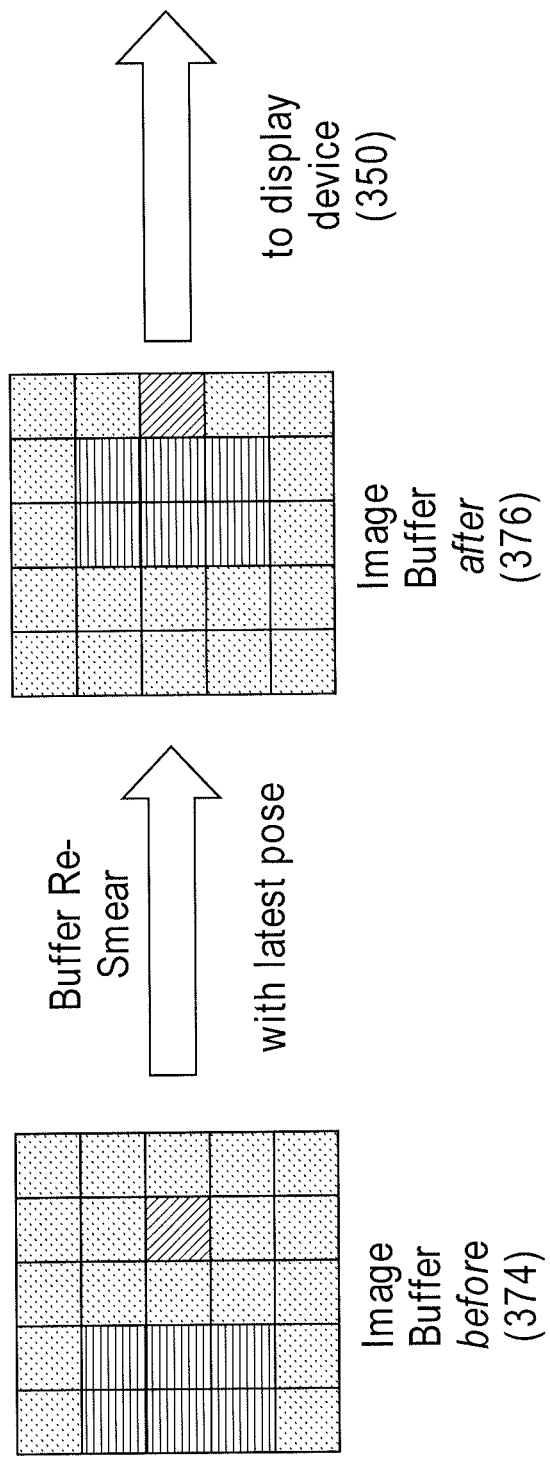
FIG. 16 illustrates buffer re-smear continuous time warp, according to one embodiment.

The RCRD CTW may not account for translation of the head of the user which requires shifting image pixels non-uniformly, depending on the pixel depth (or distance to viewer). A different CTW method, a buffer re-smear method, may be used to render images even when the viewer translates. The buffer re-smear is the concept of incorporating a latest pose estimate/prediction by updating buffered image pixels, before a read cursor extracts an image pixel to be displayed. Since different image pixels can be shifted by different amounts, buffer re-smear can account for translation of the head of the user. FIG. 16 illustrates a buffer re-smear CTW method, according to one embodiment. Buffer re-smear with latest pose performed on an image buffer 374 results in a modified image buffer 376. Image pixels from the modified image buffer 376 are displayed at the corresponding display device pixel of the display device 350.

Figure 17:
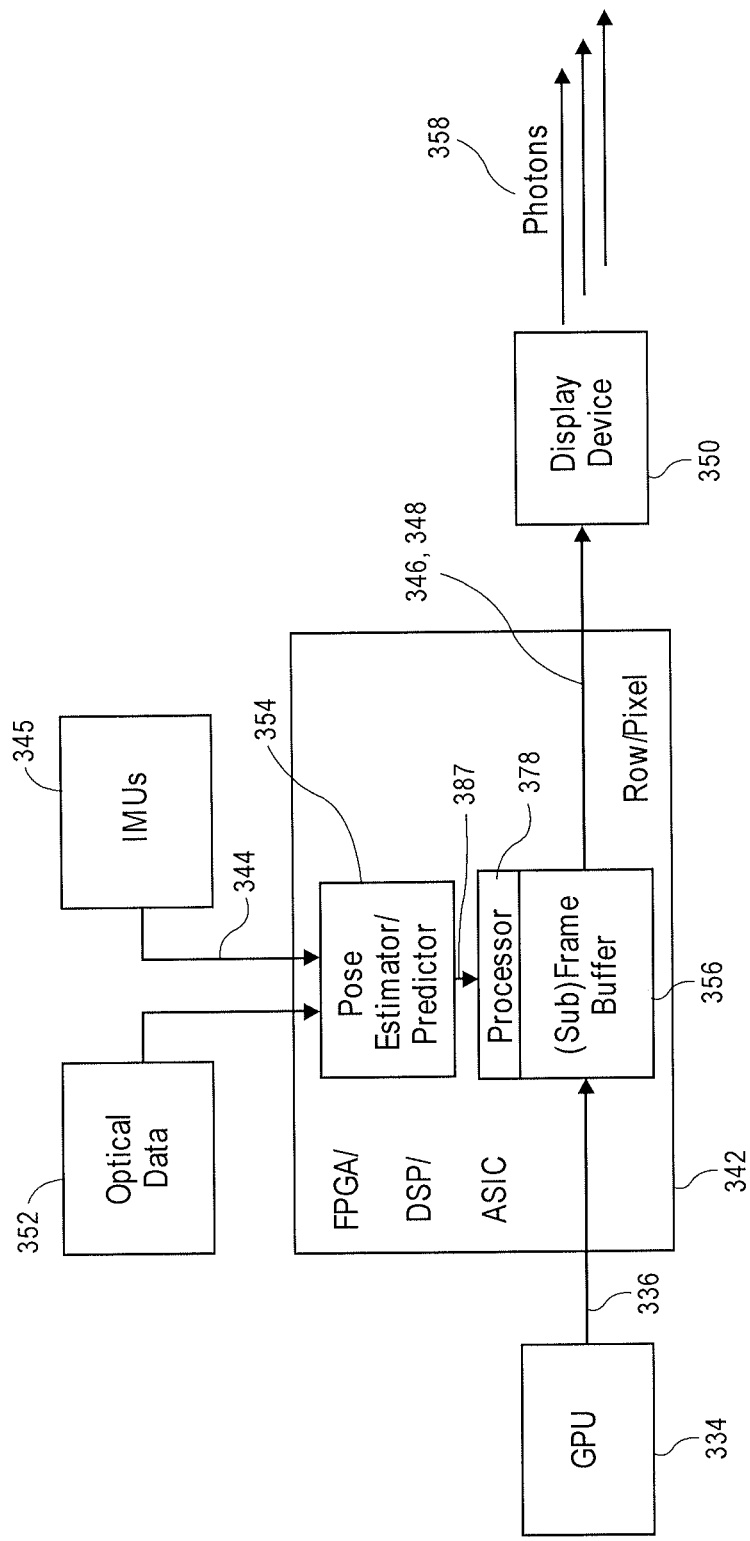
FIG. 17 illustrates a system architecture for performing buffer re-smear continuous time warp, according to an exemplary embodiment.

FIG. 17 illustrates a system architecture for buffer re-smear CTW, according to one embodiment. The external controller 342 is provided between the GPU 334 and the display device 350. The pose estimator/predictor module 354 of the external controller 342 receives the optical data 352 and IMU data 344 (from the one or more IMUs 345). The external controller 342 receives compressed image data 336 from the GPU 334 and decompresses the image data 336. The decompressed image data may be provided to the (sub)frame buffer 356 of the external controller 342. An external buffer processor 378 accomplishes the buffer re-smear on the compressed image data 336 received from the GPU 334 based on an output 387 of the pose estimator/ predictor 354 before the pixel is sent to the display device 350 to be transformed into photons 358 emitted toward the viewer's eyes.

According to various embodiments, the buffer re-smear may occur each time a new pose is to be incorporated in the displayed image, which for sequential displays could be for each pixel. Even if only portions of the (sub)frame buffer 356 are re-smeared, this is a computationally costly operation.

3. Pixel Redirection Method

Figure 18:
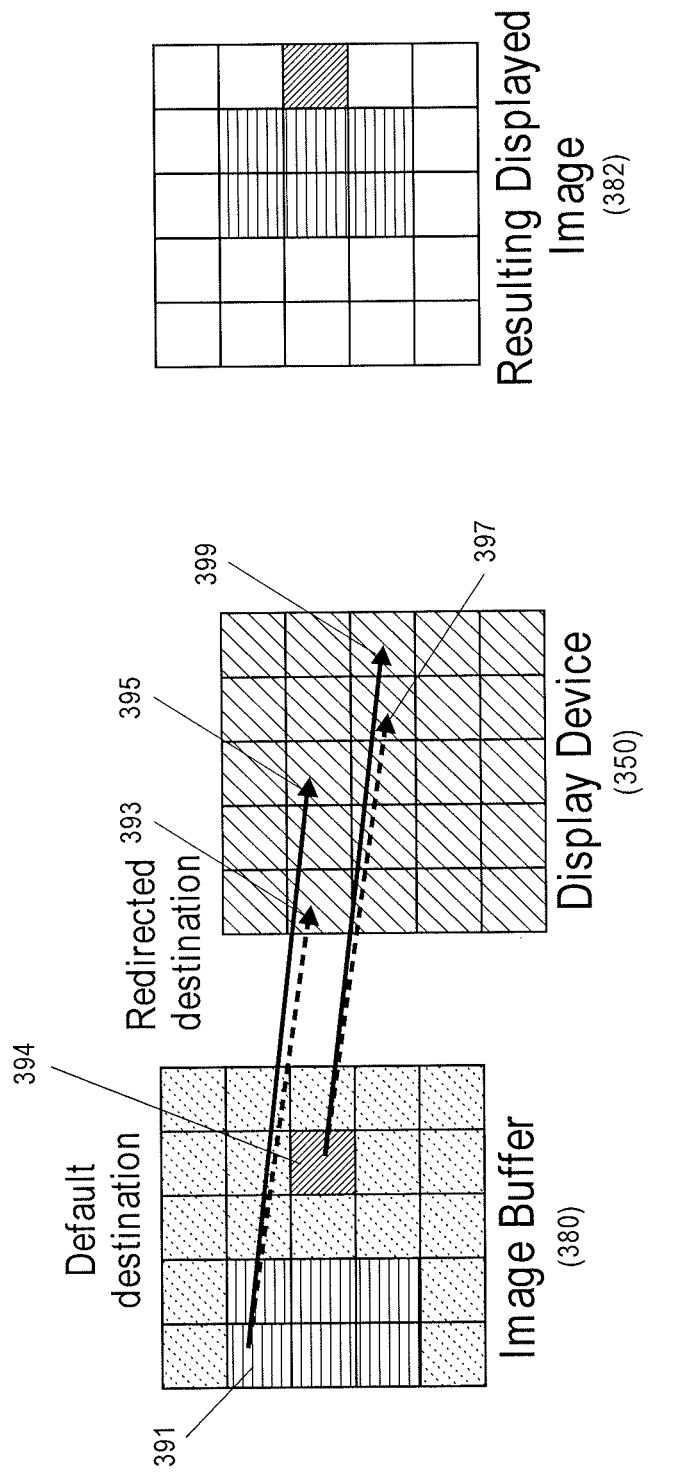
FIG. 18 illustrates pixel redirection continuous time warp, according to one embodiment.

Another CTW method may be a pixel redirection method which is the inverse operation of the read cursor redirection method. According to the pixel redirection method, instead of the display device 350 determining the appropriate image pixel to fetch, the external controller determines which display device pixel is activated for a given image pixel. In other words, the external controller determines at which display device pixel the image pixel needs to be displayed. Accordingly, in pixel redirection, each image pixel may be independently relocated. FIG. 18 illustrates that pixel redirection results in warping that can account for rotation of the head of the user and/or (partially) for translation as well.

As illustrated in FIG. 18, a first image pixel 391 in an image buffer 380 may be originally destined to be displayed at a first display device pixel 393 of the display device 350. That is, the first display device pixel 393 may be assigned to the first image pixel 391. However, the pixel redirection method may determine that the first image pixel 391 should be displayed at a second display device pixel 395 and the external controller may send the first image pixel 391 to the second display device pixel 395. Similarly, a second image pixel 394 in the image buffer 380 may be originally destined to be displayed at a third display device pixel 397 of the display device 350. That is, the second image pixel 394 may be assigned to the third display device pixel 397. However, the pixel redirection method may determine that the second image pixel 394 should be displayed at a fourth display device pixel 399 and the external controller may send the second image pixel 394 to the fourth display device pixel 399. The pixel redirection performed on the image buffer 380 results in a resulting displayed image 382 displayed on the display device 350. The pixel redirection may require a special kind of display device 350 that can selectively turn on arbitrary pixels in an arbitrary order. A special type of OLED or similar display device may be used as the display device 350. The pixels may first be redirected to a second image buffer and then the second buffer may be sent to the display device 350.

Figure 19:
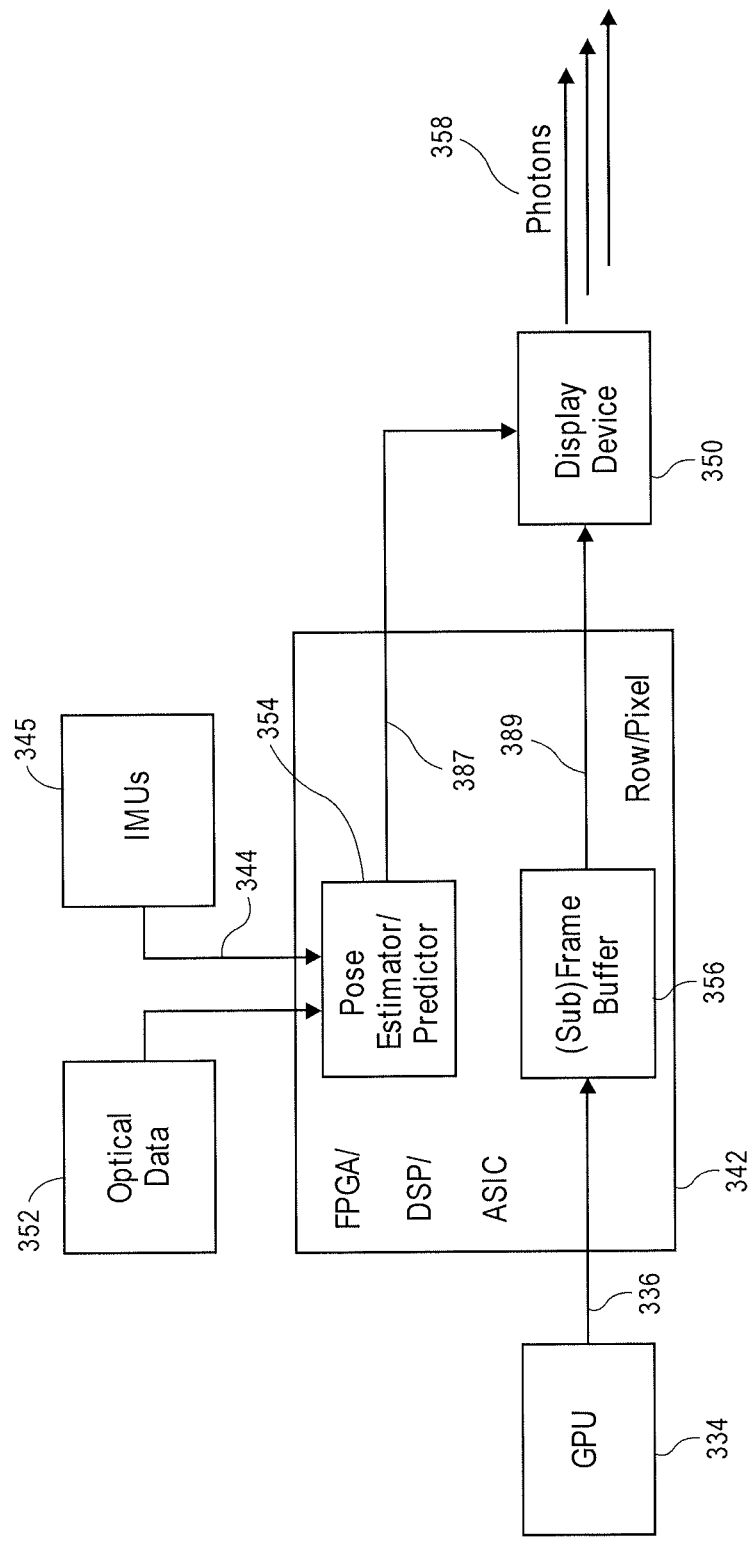
FIG. 19 illustrates a system architecture for performing pixel redirection continuous time warp, according to one embodiment.

FIG. 19 illustrates a system architecture for external hardware pixel redirection method, according to one embodiment. The external controller 342 is provided between the GPU 334 and the display device 350. The pose estimator/predictor module 354 of the external controller 342 receives the optical data 352 and the IMU data 344 (from one or more IMUs 345). The external controller 342 may receive the image data 336 from the GPU 334 and decompress the image data 336. The decompressed image data may be provided to the (sub)frame buffer 356 of the external controller 342. The output 387 of the pose estimator/predictor 354 and an output 389 of the (sub)frame buffer 356 are provided to the display device 350 to be transformed into photons 358 emitted toward the viewer's eyes.

4. Write Cursor Redirection Method

Figure 20:
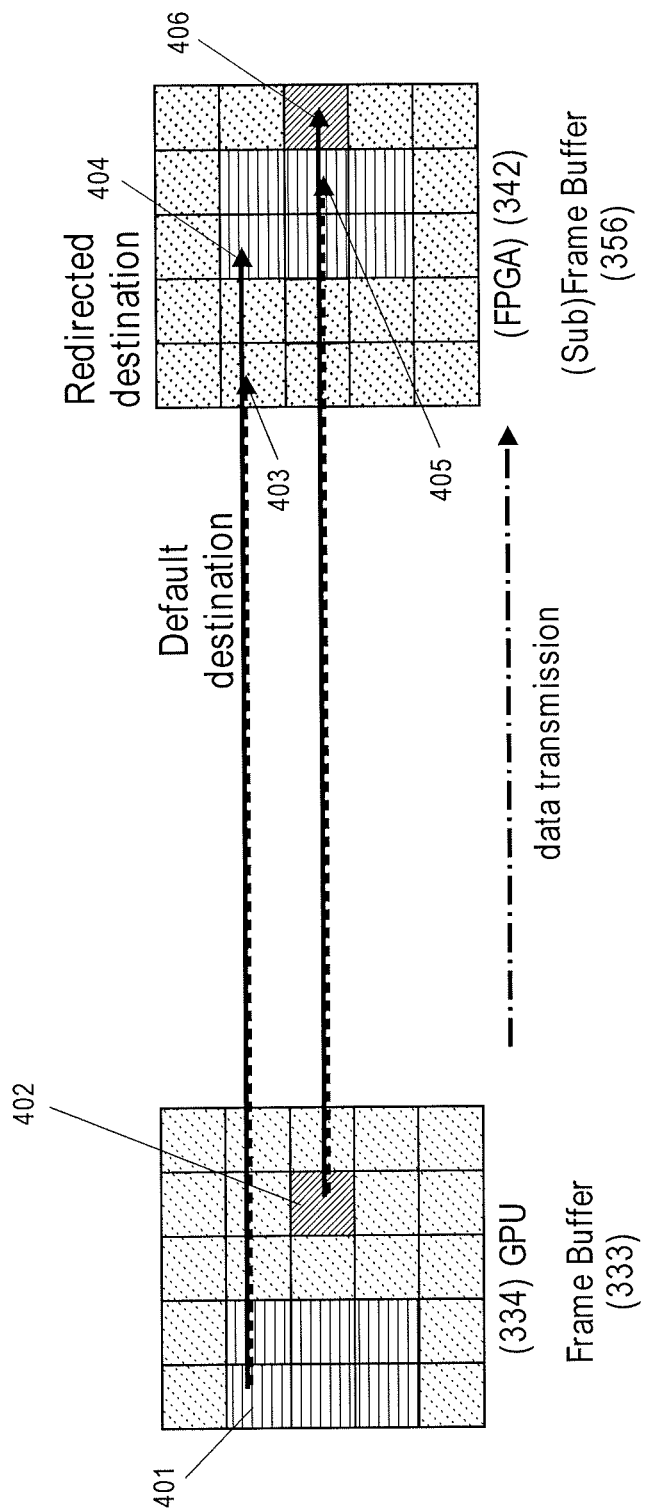
FIG. 20 illustrates write cursor redirection continuous time warp, according to one embodiment.

Another CTW method, a write cursor redirection (WCRD) method, changes the way image data is written to a (sub)frame buffer. FIG. 20 illustrates the WCRD method that can account for rotation of the head of the user and (partially) translation as well. Each pixel can be independently relocated (e.g., with forward mapping/scatter operation). For example, a first image pixel 401 in an image buffer 333 of the GPU 334 may be originally destined to a first image pixel 403 in the (sub)frame buffer 356 of the external controller 342 (e.g., FPGA). However, with forward mapping, the first image pixel 401 may be directed to a second image pixel 404 in the (sub)frame buffer 356. Similarly, a second image pixel 402 in the image buffer 333 may be originally destined to a third image pixel 405 in the (sub) frame buffer 356. However, with forward mapping, the second image pixel 402 may be directed to a fourth image pixel 406 of the (sub)frame buffer 356. Accordingly, the image may be warped during data transmission from the frame buffer 333 of the GPU 334 to the (sub)frame buffer 356 of the external controller 342 (e.g., FPGA). That is, the CTW is performed on the image before the image reaches the (sub)frame buffer 356.

Figure 21:
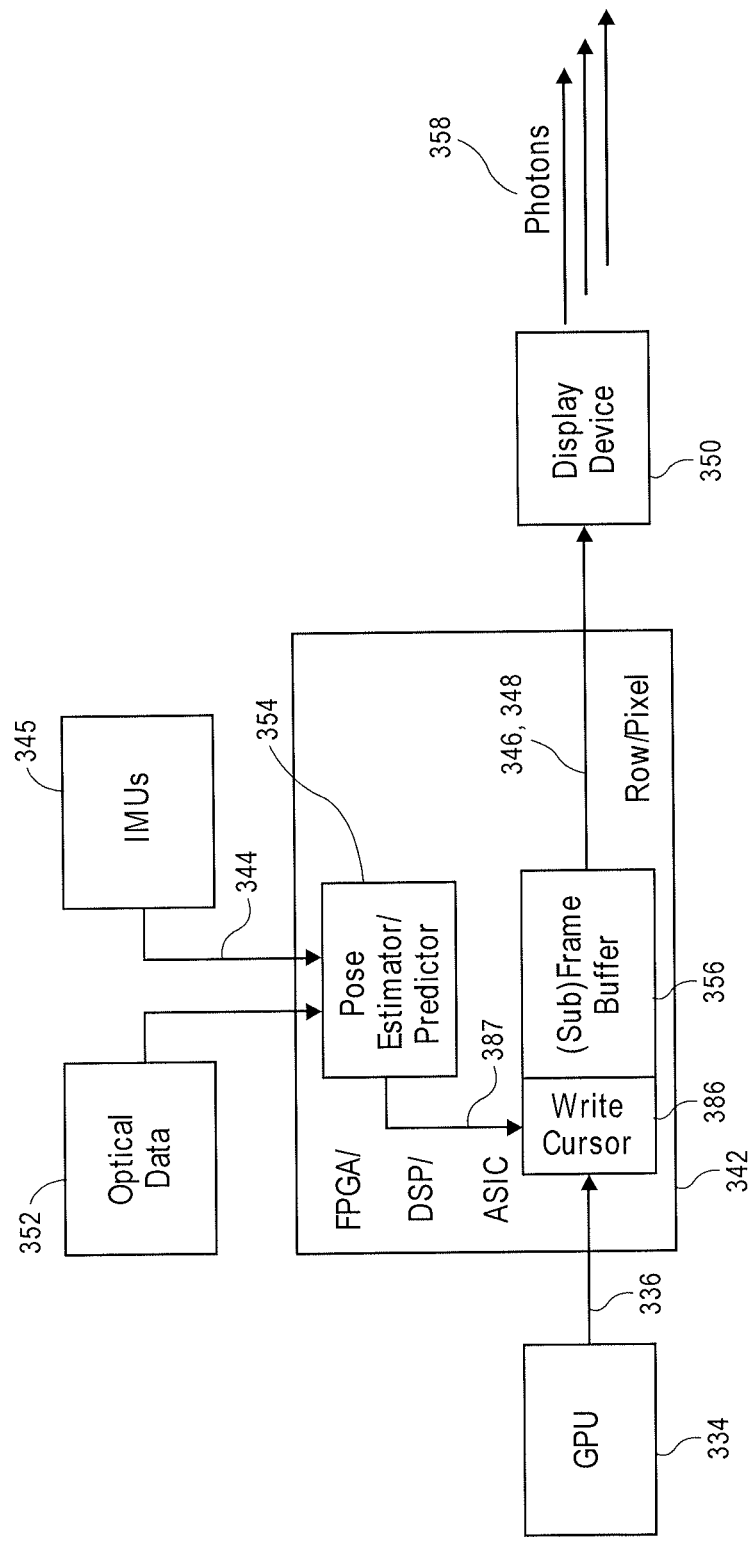
FIG. 21 illustrates a system architecture for performing write-cursor redirection continuous time warp, according to one embodiment.

FIG. 21 illustrates a system architecture for external hardware WCRD CTW, according to one embodiment. The external controller 342 is provided between the GPU 334 and the display device 350. The pose estimator/predictor module 354 of the external controller 342 receives the optical data 352 and the IMU data 344 (from one or more IMUs 345). The image data 336 transmitted by the GPU 334 (i.e., the frame buffer 333 of the GPU 334) and an output 387 of the pose estimator/predictor 354 are received at a write cursor redirection module 386 of the external controller 342. For each incoming image data pixel, the image pixel is redirected and written to a pose-consistent location in the (sub)frame buffer 356 based on the current pose estimate/prediction and that image pixel's depth. An output 346, 348 of the (sub)frame buffer 356 is time warped image data which is then sent to the display device 350 to be transformed into photons 358 emitted toward the viewer's eyes.

According to various embodiments, the write cursor redirection module 386 may be a 1-pixel buffer, as the external controller 342 needs to process where the image pixel should be written to.

Figure 22:
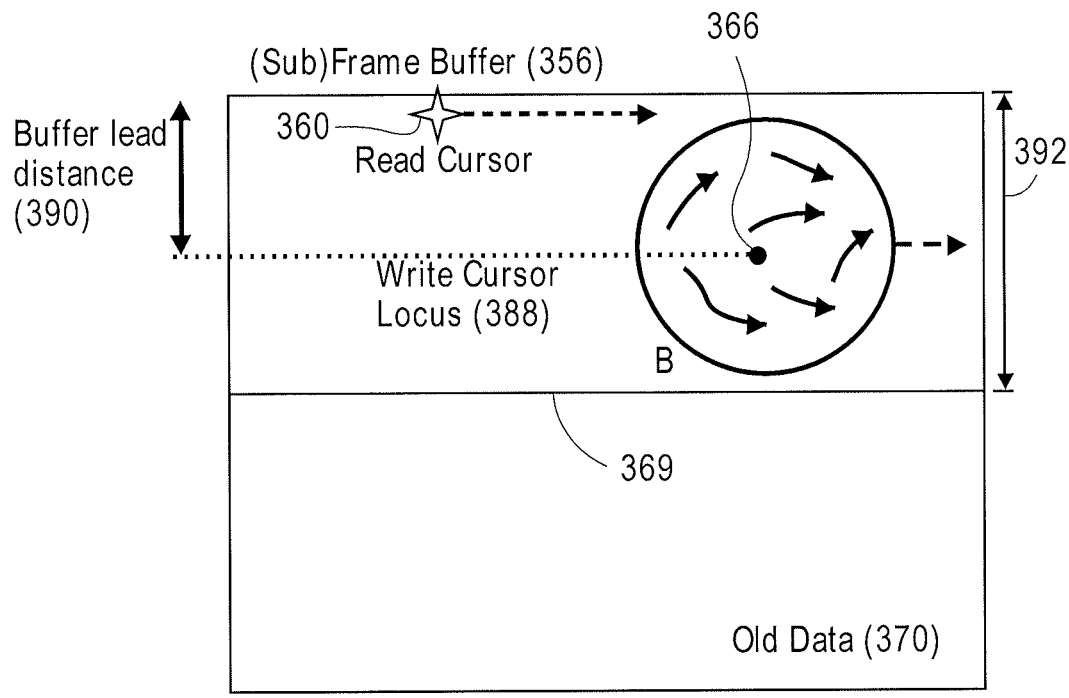
FIG. 22 illustrates a write cursor having a locus, according to one embodiment.

FIG. 22 illustrates the WCRD method where the write cursor 366 has a locus of the write positions is a closed set within a bounded area (e.g., a circle B) 388 advancing through the (sub)frame buffer 356. A buffer height 392 of the (sub)frame buffer 356 needs to be equal to or greater than the diameter of the bounded area 388. The WCRD method may require a buffer lead distance 390 between the center of the bounded area 388 and the read cursor 360. According to various embodiments, the buffer lead distance 390 may be a function of at least one or more of a frame rate of the display device, a resolution of the image, and an expected speed of the head motion.

According to some embodiments, the WCRD method may introduce some pose estimate/prediction-to-photon latency, because the pose estimate/prediction may be incorporated a certain amount of time (proportional to the buffer lead distance) before the photons are generated. For example, for a display clock-out rate of 60 fps, 10 line buffering of a 1000 line image may introduce 0.16 ms of pose estimate/prediction-to-photon latency.

5. Write/Read Cursor Redirection Method

Figure 23:
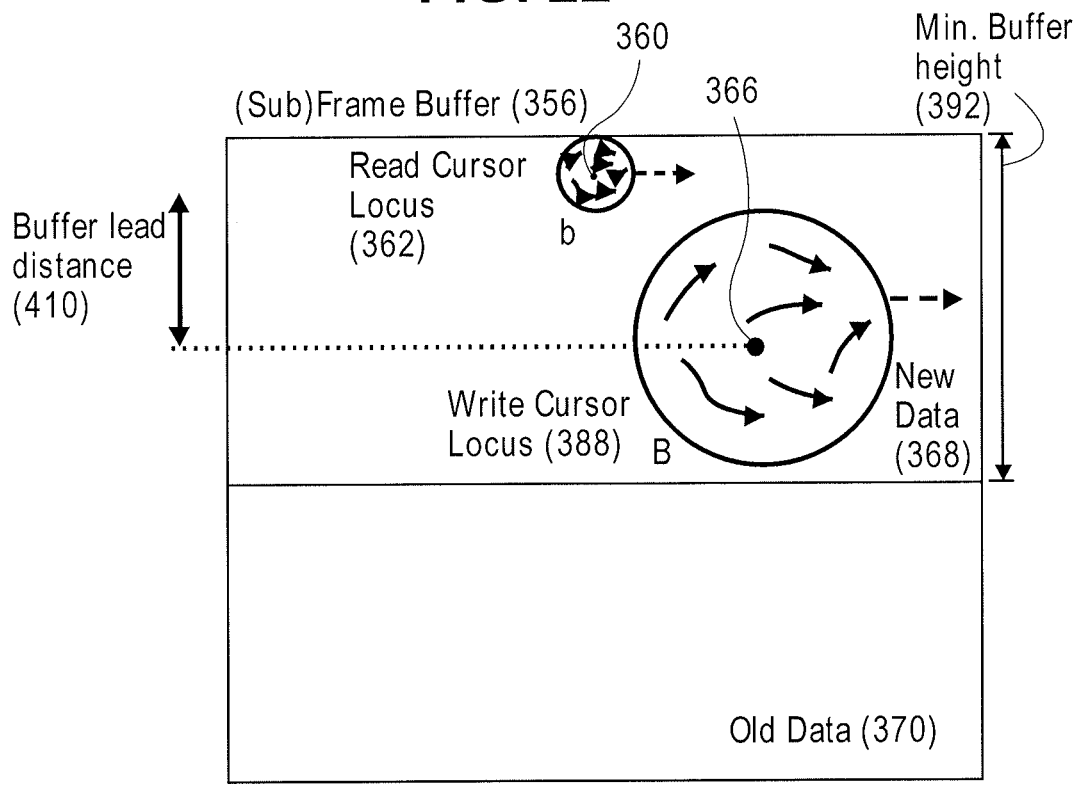
FIG. 23 illustrates each one of a write cursor and a read cursor having a locus, according to one embodiment.

The CTW methods discussed herein may not be mutually exclusive. By supplementing the WCRD method with the RCRD method, the rotation and translation of the viewer may be accounted for. FIG. 23 illustrates that with a write-read cursor redirection (WRCRD) method, both write and read cursor positions are within bounded areas 388 and 362, respectively, but the bounded area 362 of the read cursor 360 is much smaller compared to the bounded area 388 of the write cursor 366. A minimum buffer height 392 may be determined to accommodate both the bounded area 362 and the bounded area 388, without causing cross over from the new data region 368 to the old data region 370. In some embodiments, the minimum buffer height 392 for the WRCRD method may be twice as large as the buffer height 364 for the RCRD method. In addition, a buffer lead distance 410 may be determined to accommodate both the bounded area 362 and the bounded area 388, without causing cross over from the new data region 368 to the old data region 370. In some embodiments, the buffer lead distance 410 for the WRCRD method may be twice as large (e.g., 20 lines) as the buffer lead distance 390 for WCRD (e.g., 10 lines) or the buffer lead distance 372 for RCRD (e.g., 10 lines).

According to some embodiments, the size of the bounded area 388 is proportional to how much pose adjustment is required since a last pose incorporation at render. The size of the bounded area 362 is also proportional to how much pose adjustment is required since a last pose incorporation at pixel data write to a (sub)frame buffer. If the read cursor's buffer distance to the write cursor is 10 lines in a 1000 line image, then the elapsed time between a time when image data is written in a pixel by the write cursor 366 and a time when the image data is read from the pixel by the read cursor 360 is approximately 1% of the elapsed time between the pose estimate of the write cursor 366 and the pose estimate at render time. In other words, when the read cursor 360 is closer to the write cursor 366, the read cursor 360 will read more recent data (e.g., data that is more recently written by the write cursor 366) and thereby reduce the time between when the image data is written and when the image data is read. Hence, the buffer size and lead distance may not need to be doubled but only increased by a few percent.

The RCRD in the WRCRD method may not account for translation of the head of the user. However, the WCRD in the WRCRD method that occurs slightly earlier accounts for translation of the head of the user. Hence, WRCRD may achieve very low (e.g., virtually zero) latency parametric warping and very low latency non-parametric warp (e.g., approximately 0.16 ms for display clock-out at 60 fps, and 10 line buffering of a 1000 line image).

Figure 24:
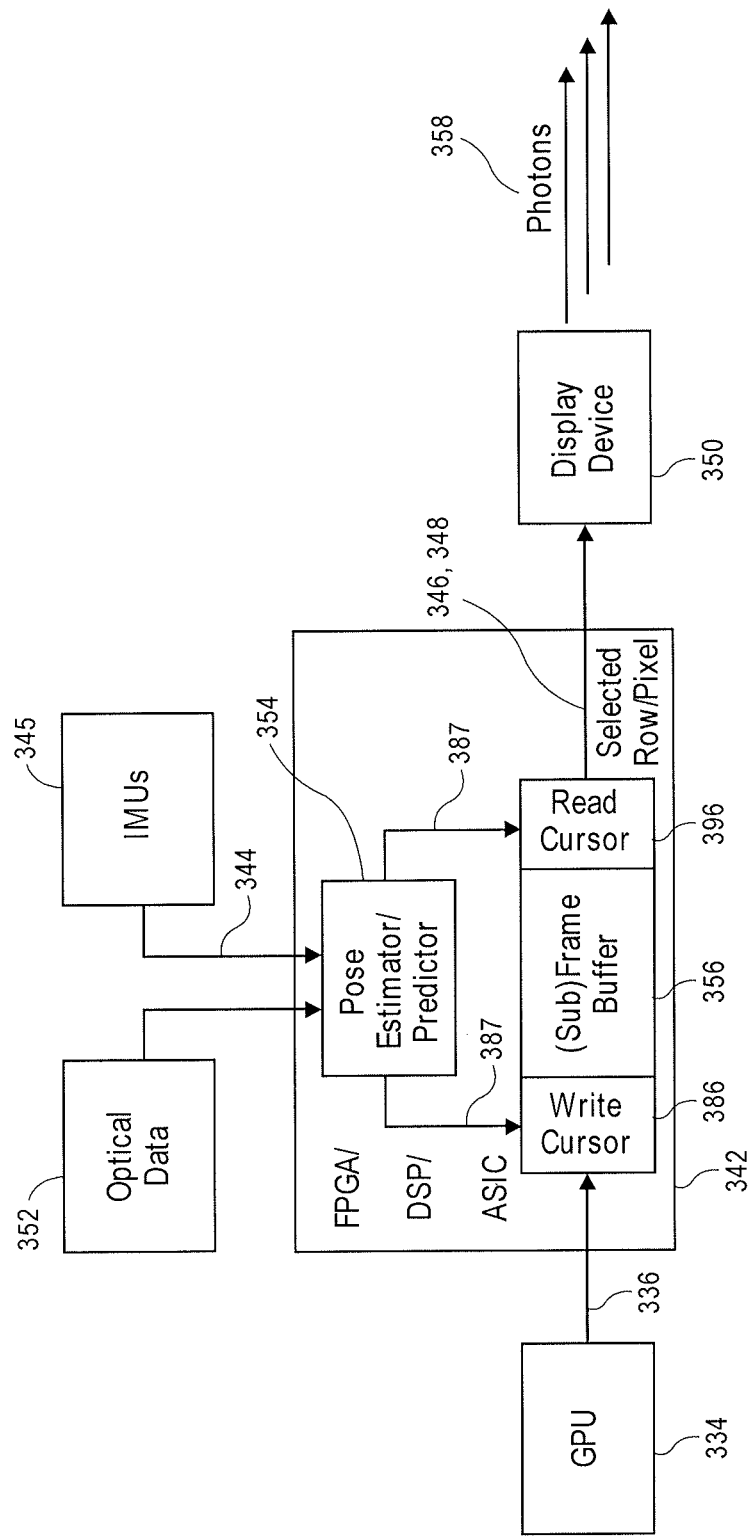
FIG. 24 illustrates a system architecture for performing write/read cursor redirection continuous time warp, according to one embodiment.

A system architecture for external hardware WRCRD CTW is illustrated in FIG. 24, according to one embodiment. The external controller 342 is provided between the GPU 334 and the display device 350. The pose estimator/predictor module 354 of the external controller 342 receives the optical data 352 and the IMU data 344 (from one or more IMUs 345). The image data 336 transmitted by the GPU 334 (i.e., the frame buffer 333 of the GPU 334) and an output 387 of the pose estimator/predictor 354 are received at the write cursor redirection module 386. For the incoming image data, each image pixel is redirected and written to a pose-consistent location in the (sub)frame buffer 356 based on the current pose estimate/prediction and that image pixel's depth. In addition, a read cursor redirection module 396 performs RCRD CTW to transform the image data received from the write cursor redirection module 386 based on the output 387 of the pose estimator/predictor 354. The generated data 346, 348 is time warped image data which is then sent to the display device 350 to be transformed into photons 358 emitted toward the viewer's eyes. According to various embodiments, the WRCRD method can be implemented on the same external controller 342, operating on a single (sub)frame buffer 356, and also operating on streamed data. The write cursor redirection module 386 and/or the read cursor redirection module 396 may be independently turned off for different display options. Accordingly, the WRCRD architecture may function as a WCRD or RCRD architecture on demand.

III. Binocular Time Warp

Figure 25:
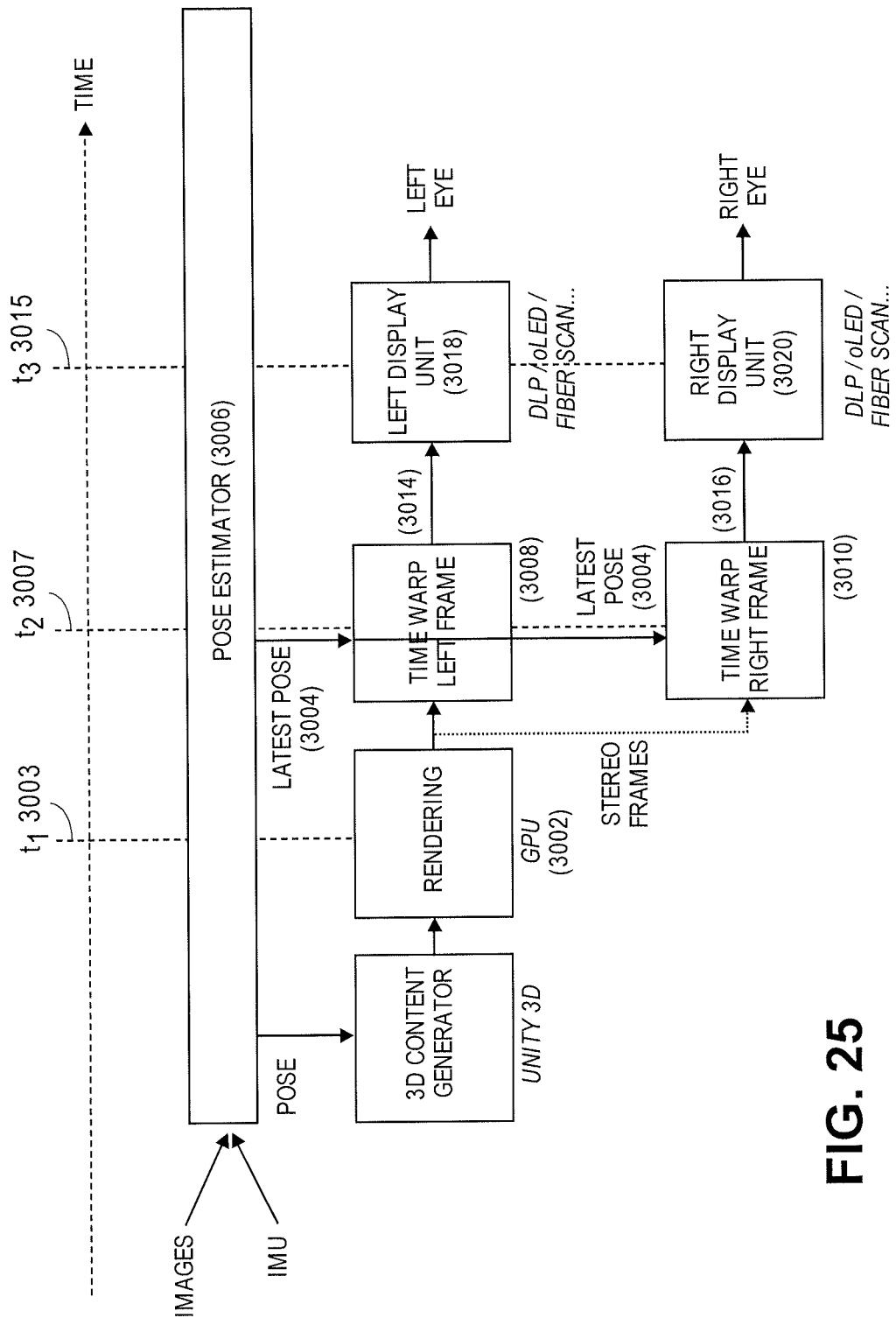
FIG. 25 illustrates binocular time warp, according to one embodiment.

As used herein, binocular time warp refers to the late-frame time warp used in connection with a display device including a left display unit for the left eye and a right display unit for the right eye where the late-frame time warp is performed separately for the left display unit and the right display unit. FIG. 25 illustrates binocular time warp where once 3D content is rendered at GPU 3002 at time t1 3003 and a latest pose input 3004 is received from a pose estimator 3006 before time t2 3007, and a time warp is performed for both a left frame 3008 and a right frame 3010 at the same or approximately the same time at time t2 3007. For example, in embodiments where both time warps are performed by the same external controller, then the time warp for the left frame and the time warp for the right frame may be performed sequentially (e.g., approximately at the same time).

Transformed images 3014 and 3016 (i.e., the image where the time warp is performed) are sent to a left display unit 3018 and a right display unit 3020 of the display device 350, respectively. Photons are generated at the left display unit 3018 and the right display unit 3020, and emitted toward respective eyes of the viewer, thereby displaying an image on the left display unit 3018 and the right display unit 3020 at the same time (e.g., time t3 3015). That is, in one embodiment of the binocular time warp, the same latest pose 3004 is used for performing time warp on the same rendered frame for both the left display unit 3018 and the right display unit 3020.

In another embodiment, staggered binocular time warp where different latest poses may be used to perform time warp for the left display unit 3018 and the right display unit 3020. Staggered time warp may be performed in a variety of manners, as illustrated in FIG. 26 through FIG. 29. The staggered binocular time warps illustrated in FIG. 26 through FIG. 29 enable to present latest pose update information on the image displayed on the display device 350. The old frame (i.e., the previously displayed frame or the frame received from the GPU) may be used to interpolate for time warp. With the staggered binocular time warp, the latest pose can be incorporated in the displayed image and reduce motion-to-photon latency. That is, one of the eyes may view an image with a later pose incorporated into the warping than the other rather than both being updated at same time using an "older" latest pose.

Figure 26:
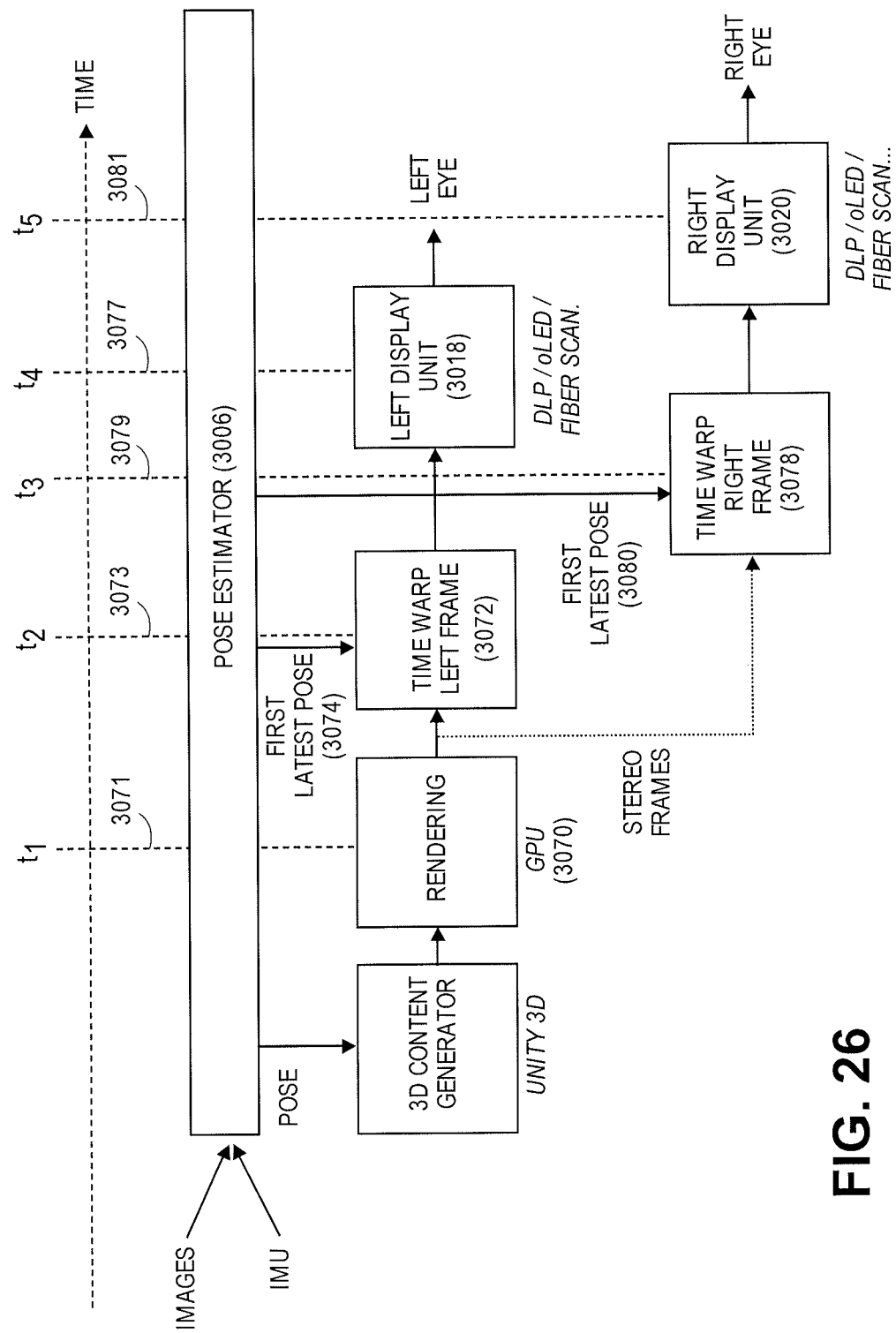
FIG. 26 illustrates staggered binocular time warp, according to yet another embodiment.

FIG. 26 illustrates another staggered binocular time warp, according to one embodiment. A same GPU 3070 is used to generate both left and right rendered perspectives at time t1 3071 that are used by the left display unit 3018 and the right display unit 3020, respectively. A first time warp is performed by a time warp left frame module 3072 on the rendered left frame at time t2 3073 using a first latest pose 3074 received from the pose estimator 3006. The output of the time warp left frame module 3072 is transmitted to the left display unit 3018. The left display unit 3018 transforms the received data to photons and emits the photons toward the left eye of the viewer, thereby displaying an image on the left display unit 3018 at time t4 3079.

A second time warp is performed by a time warp right frame module 3078 on the rendered right frame at time t3 3077 (e.g., at a later time than t2 3073 when the first time warp is performed) using a second latest pose 3080 received from the pose estimator 3006. The output of the time warp right frame module 3078 is transmitted to the right display unit 3020. The right display unit 3020 transforms the received data to photons and emits the photons toward the right eye of the viewer, thereby displaying an image on the right display unit 3020 at time t5 3081. The right display unit 3020 displays an image at a later time than the left display unit 3018 displays an image.

Figure 27:
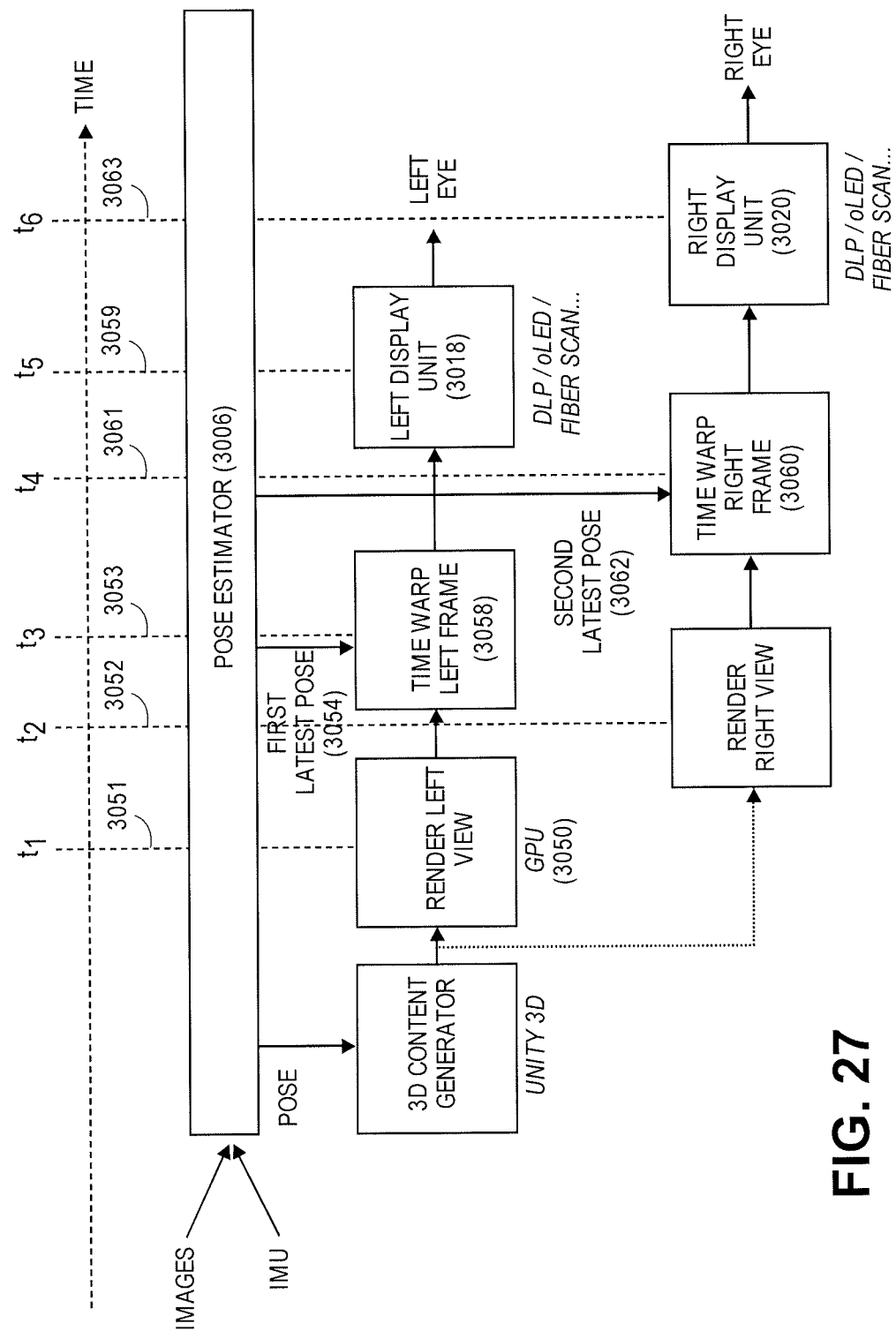
FIG. 27 illustrates staggered binocular time warp, according to another embodiment.

FIG. 27 illustrates another type of staggered binocular time warp, according to one embodiment. A same GPU 3050 is used to generate the rendered frames for both the left display unit 3018 and the right display unit 3020. A left frame and a right frame are rendered at different times (i.e., the left frame and the right frame are rendered staggered in time). As illustrated, the left frame may be rendered at time t1 3051 and the right frame may be rendered at time t2 3052, which is later than time t1 3051. A first time warp is performed by a time warp left frame module 3058 on the rendered left frame at time t3 3053 using a first latest pose 3054 received from the pose estimator 3006 before time t3 3053. The output of the time warp left frame module 3058 is transmitted to the left display unit 3018. The left display unit 3018 transforms the received data to photons and emits the photons toward the left eye of the viewer, thereby displaying an image on the left display unit 3018 at time t5 3061.

A second time warp is performed by a time warp right frame module 3060 on the rendered right frame at time t4 3059 (e.g., at a later time than t3 3053 when the first time warp is performed) using a second latest pose 3062 received from the pose estimator 3006 before time t4 3059. The output of the time warp right frame module 3060 is transmitted to the right display unit 3020. The right display unit 3020 transforms the received data to photons and emits the photons toward the right eye of the viewer, thereby displaying an image on the right display unit 3020 at time t6 3063. The right display unit 3020 displays an image at a later time than the left display unit 3018 displays an image.

Figure 28:
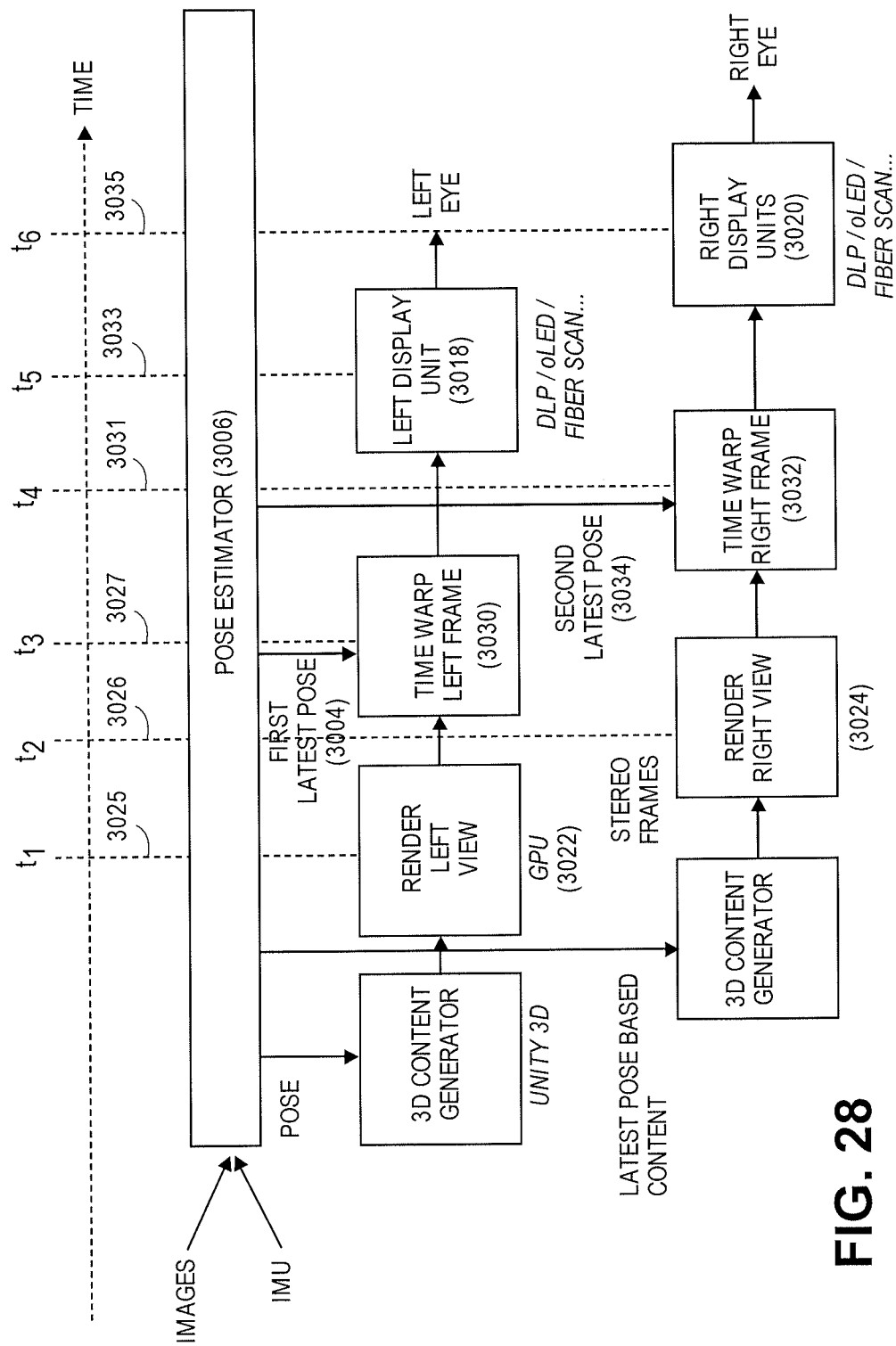
FIG. 28 illustrates a staggered binocular time warp, according to one embodiment.

FIG. 28 illustrates a staggered binocular time warp, according to one embodiment. According to the embodiment illustrated in FIG. 28, two separate GPUs 3022 and 3024 may be used to generate rendered views for the left display unit 3018 and the right display unit 3020. The first GPU 3022 may render the left view at time t1 3025. The second GPU 3024 may render the right view at time t2 3026, later than time t1 3025. A first time warp is performed by a time warp left frame module 3030 on the rendered left view at time t3 3027 using a first latest pose 3004 received from the pose estimator 3006 before time t3 3027. The output of the time warp left frame module 3030 is transmitted to the left display unit 3018. The left display unit 3018 transforms the received data to photons and emits the photons toward the left eye of the viewer. The left display unit 3018 displays an image at time t5 3033.

A second time warp is performed by a time warp right frame module 3032, at time t4 3031 (e.g., a later time than when the first time warp is performed), on the rendered right view using a second latest pose 3034 received from the pose estimator 3006 before time t4 3031 (e.g., a later time than when the first latest pose 3004 is obtained by the time warp left frame module 3030). The output of the time warp right frame module 3032 is transmitted to the right display unit 3020. The right display unit 3020 transforms the received data to photons and emits the photons toward the right eye of the viewer. The right display unit 3020 displays an image at time t6 3035 (i.e., a later time than when the left display unit 3018 displays an image at time t5 3033). The image displayed on the right display unit 3020 may be more up-to-date as it has been generated taking into consideration a more recent pose (i.e., the second latest pose 3034).

Figure 29:
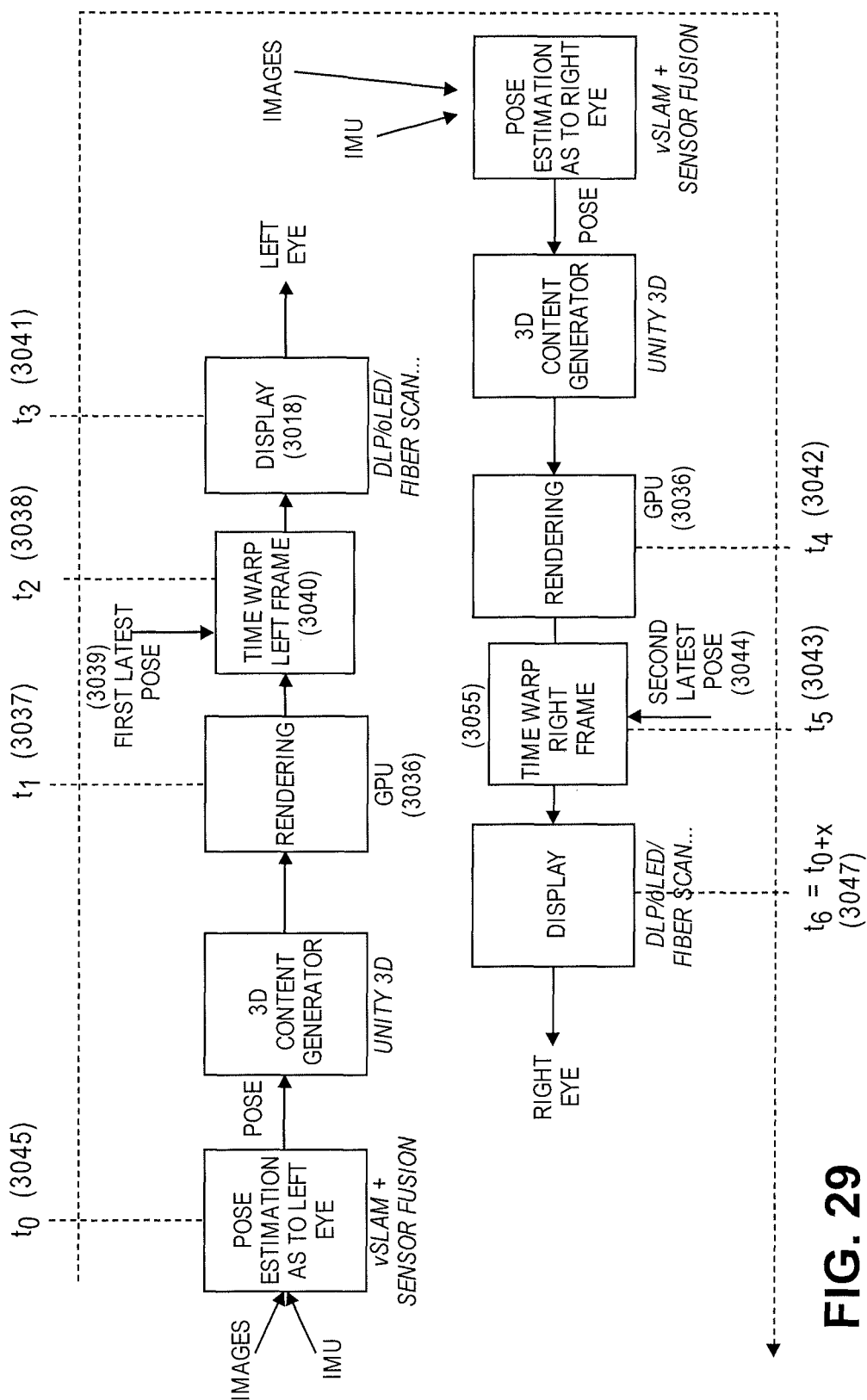
FIG. 29 illustrates binocular time warp, according to another embodiment.

FIG. 29 illustrates another type of binocular time warp, according to one embodiment. A same GPU 3036 may be used to generate rendered views for both the left display unit 3018 and the right display unit 3020. As illustrated in FIG. 29, the GPU 3036 may generate a rendered view of a left frame at time t1 3037. A time warped image of the left frame may be generated at time t3 3041. The display update rate of the left display unit 3018 may be slow enough that a second rendering (i.e., rendering for the right display unit 3020) may be performed by the GPU 3036 after the time warped image of the left frame is generated (e.g., the time warped image of the left frame is displayed on the left display unit 3018).

A first time warp is performed by a time warp left frame module 3040 on the rendered left frame at time t2 3038 using first latest pose 3039 received from the IMU. The output of the time warp left frame module 3040 is transmitted to the left display unit 3018. The left display unit 3018 transforms the received data to photons and emits the photons toward the left eye of the viewer, thereby displaying an image on the left display unit 3018 at time t3 3041. After the image is displayed on the left display unit 3018, the GPU 3036 may render a right frame with acquired data (e.g., data received from the images and the IMUs to generate pose estimation as to the right eye, and the 3D content generated from the pose estimation) at time t4 3042. A second time warp is performed by a time warp right module 3055 on the rendered right frame at time t5 3043 (e.g., after the time warped image is displayed on the left display unit 3018 at time t3 3041), using second latest pose 3044 received from the IMU. The output of the time warp right frame module 3046 is transmitted to the right display unit 3020. The right display unit 3020 transforms the received data to photons and emits the photons toward the right eye of the viewer, thereby displaying an image on the right display unit 3020 at time t6 3047. The right display unit 3020 displays an image "x" seconds later than data is received from the images and the IMUs, where x is a mathematical relationship that is less than the refresh rate required for smooth viewing. Accordingly, the two display units (i.e., the left display unit 3018 and the right display unit 3020) update completely offset from one another, where each update is sequential to the other (e.g., 2x<refresh rate required for smooth viewing).

One of ordinary skill in the art will appreciate that the order in which the left display unit and the right display unit displays an image may be different than what is discussed above in connection with FIG. 26 through FIG. 29. The system may be modified such that the left display unit 3018 displays an image at a later time than the right display unit 3020 displays an image.

It is also understood that the examples and embodiments described herein are for illustrative purposes only and that various modifications or changes in light thereof will be suggested to persons skilled in the art and are to be included within the spirit and purview of this application and scope of the appended claims.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for time warping an image frame based on an updated position of a viewer, the method comprising:
rendering, by a graphics processing unit at a first time, an image frame for a binocular near-eye display device, wherein the image frame corresponds to a first view perspective associated with a first position of the viewer, and wherein the image frame comprises a first image frame and a second image frame;
receiving, by the graphics processing unit at a second time later than the first time, data associated with a second position of the viewer;
time warping, by the graphics processing unit, at least a portion of the first image frame using the data associated with the second position of the viewer to generate an updated first image frame that aligns with the second position of the viewer for a first display of the binocular near-eye display device, wherein time warping of at least the portion of the first image frame is completed before the first display is turned on;
time warping, by the graphics processing unit, at least a portion of the second image frame to generate an updated second image frame for a second display of the binocular near-eye display device, wherein the updated second image frame is generated separately from the updated first image frame before the updated second image frame is transmitted to the binocular near-eye display device, wherein time warping of at least the portion of the second image frame is completed before the second display is turned on;
transmitting, by the graphics processing unit, the updated first image frame to the first display without further modifications to the updated first image frame; and
transmitting, by the graphics processing unit, the updated second image frame to the second display without further modifications to the updated first image frame.

2. The method of claim 1, further comprising:
time warping, by the graphics processing unit, at least the portion of the second image frame using the data associated with the second position of the viewer to generate the updated second image frame that aligns with the second position of the viewer.

3. The method of claim 2, wherein the first image frame and the second image frame are time warped substantially at a same time.

4. The method of claim 2, wherein the updated first image frame and the updated second image frame are generated sequentially.

5. The method of claim 2, further comprising:
displaying the updated first image frame on the first display of the binocular near-eye display device, and
displaying the updated second image frame on the second display of the binocular near-eye display device,
wherein the updated first image frame and the updated second image frame are displayed substantially at a same time.

6. The method of claim 2, further comprising:
displaying the updated first image frame on the first display of the binocular near-eye display device, and
displaying the updated second image frame on the second display of the binocular near-eye display device,
wherein the updated first image frame and the updated second image frame are displayed sequentially.

7. The method of claim 1, further comprising:
receiving, by the graphics processing unit at a third time later than the second time, data associated with a third position of the viewer;
time warping, by the graphics processing unit, at least the portion of the second image frame using the data associated with the third position of the viewer to generate the updated second image frame that aligns with the third position of the viewer.

8. The method of claim 7, further comprising:
interpolating, by the graphics processing unit, the data associated with the third position of the viewer into the second image frame to generate the updated second image frame.

9. The method of claim 7, wherein the updated first image frame is transmitted to the first display of the binocular near-eye display device before the updated second image frame is transmitted to the second display of the binocular near-eye display device.

10. The method of claim 7, further comprising:
displaying the updated first image frame on the first display of the binocular near-eye display device, and
displaying the updated second image frame on the second display of the binocular near-eye display device,
wherein the updated first image frame is displayed before the updated second image frame.

11. The method of claim 1, wherein the first image frame and the second image frame are rendered staggered in time such that the first image frame is rendered before the second image frame.

12. The method of claim 1, wherein the first display is a left display and the second display is a right display.

13. A graphics processing unit comprising:
a processor; and
a non-transitory computer-readable medium coupled to the processor, the non-transitory computer-readable medium storing instructions that, when executed by the processor, cause the processor to:
render, at a first time, an image frame for a binocular near-eye display device, wherein the image frame corresponds to a first view perspective associated with a first position of a viewer, and wherein the image frame comprises a first image frame and a second image frame;
receive, at a second time later than the first time, data associated with a second position of the viewer;
time warp at least a portion of the first image frame using the data associated with the second position of the viewer to generate an updated first image frame that aligns with the second position of the viewer for a first display of the binocular near-eye display device, wherein time warping of at least the portion of the first image frame is completed before the first display is turned on;
time warp at least a portion of the second image frame to generate an updated second image frame for a second display of the binocular near-eye display device, wherein the updated second image frame is generated separately from the updated first image frame before the updated second image frame is transmitted to the binocular near-eye display device, wherein time warping of at least the portion of the second image frame is completed before the second display is turned on;
transmit the updated first image frame to the first display without further modifications to the updated first image frame; and
transmit the updated second image frame to the second display without further modifications to the updated first image frame.

14. The graphics processing unit of claim 13, wherein the non-transitory computer-readable medium further stores instructions that, when executed by the processor, cause the processor to:
    time warp, by the graphics processing unit, at least the portion of the second image frame using the data associated with the second position of the viewer to generate the updated second image frame that aligns with the second position of the viewer.

15. The graphics processing unit of claim 14, wherein the first image frame and the second image frame are time warped substantially at a same time.

16. The graphics processing unit of claim 14, wherein the updated first image frame and the updated second image frame are generated sequentially.

17. The graphics processing unit of claim 13, wherein the non-transitory computer-readable medium further stores instructions that, when executed by the processor, cause the processor to:
    receive, at a third time later than the second time, data associated with a third position of the viewer;
    time warp at least the portion of the second image frame using the data associated with the third position of the viewer to generate the updated second image frame that aligns with the third position of the viewer.

18. The graphics processing unit of claim 17, wherein the non-transitory computer-readable medium further stores instructions that, when executed by the processor, cause the processor to:
    interpolate the data associated with the third position of the viewer into the second image frame to generate the updated second image frame.

19. The graphics processing unit of claim 17, wherein the updated first image frame is transmitted to the first display of the binocular near-eye display device before the updated second image frame is transmitted to the second display of the binocular near-eye display device.

20. The graphics processing unit of claim 13, wherein the first image frame and the second image frame are rendered staggered in time such that the first image frame is rendered before the second image frame.

* * * * *